(12) United States Patent
Ogawa et al.

(10) Patent No.: US 11,176,496 B2
(45) Date of Patent: Nov. 16, 2021

(54) FUTURE PREDICTION SIMULATION APPARATUS, METHOD, AND COMPUTER PROGRAM

(71) Applicant: INTEGRATTO INC., Tokyo (JP)

(72) Inventors: Yasushi Ogawa, Tokyo (JP); Takeshi Kabata, Kanagawa (JP); Noboru Nishimura, Tokyo (JP)

(73) Assignee: INTEGRATTO INC., Tokyo (JP)

( * ) Notice: Subject to any disclaimer, the term of this patent is extended or adjusted under 35 U.S.C. 154(b) by 15 days.

(21) Appl. No.: 16/609,844

(22) PCT Filed: Jun. 6, 2018

(86) PCT No.: PCT/JP2018/021689
§ 371 (c)(1),
(2) Date: Oct. 31, 2019

(87) PCT Pub. No.: WO2019/234845
PCT Pub. Date: Dec. 12, 2019

(65) Prior Publication Data
US 2021/0049522 A1 Feb. 18, 2021

(51) Int. Cl.
*G06Q 10/04* (2012.01)
*G06F 9/54* (2006.01)
(Continued)

(52) U.S. Cl.
CPC .......... *G06Q 10/04* (2013.01); *G06F 9/542* (2013.01); *G06N 7/005* (2013.01); *G06Q 40/06* (2013.01)

(58) Field of Classification Search
CPC ........ G06Q 10/04; G06Q 40/06; G06F 9/542; G06N 7/005
See application file for complete search history.

(56) References Cited

U.S. PATENT DOCUMENTS

2003/0101122 A1    5/2003  Merkoulovitch et al.
2016/0273314 A1*   9/2016  Tanuma ................ G06Q 50/02

FOREIGN PATENT DOCUMENTS

JP    2004-252971 A    9/2004
JP    2005-100221 A    4/2005
(Continued)

OTHER PUBLICATIONS

International Search Report and Written Opinion of the International Searching Authority dated Aug. 21, 2018 in PCT application No. PCT/JP2018/021689.
(Continued)

*Primary Examiner* — Saif A Alhija
(74) *Attorney, Agent, or Firm* — Plumsea Law Group, LLC

(57) ABSTRACT

To improve a future prediction simulation technology in order to more accurately predict the future by enabling a mathematics expression and an operand numerical value to be appropriately corrected, a server executes, as a future prediction simulation apparatus, a future prediction simulation by using mathematics expression data and operand numerical data for specifying a mathematics expression and an operand numerical value, which are recorded in a server recorder and which are to be used in the future prediction simulation. The server includes an interpreting unit, a related information collecting unit, and a determining unit. The interpreting unit reads from the server recorder basis data, which is text data for specifying the basis used by the user to determine the mathematics expression and the operand numerical value, and generates interpretation data. The related information collecting unit collects related information related to the basis data by crawling the Internet using the interpretation data. When related information is found, the determining unit generates alert data.

20 Claims, 8 Drawing Sheets

| MATHEMATICS EXPRESSION (MATHEMATICS EXPRESSION DATA) | OPERAND NUMERICAL VALUE (OPERAND NUMERICAL DATA) | BASIS (BASIS DATA) |
|---|---|---|
| $X_1+X_2=1.0$ | $X_1=0.60$  $X_2=0.40$ | THE SHARE OF PRODUCT A IS CURRENTLY 60% FOR COMPANY A AND 40% FOR COMPANY B. |
| $Y_1=X_1/X_3+X_2/X_4+X_5+f(X_5)$ | $X_1=0.60$  $X_2=0.40$ $X_3=500$  $X_4=600$  $X_5=300$ | THE PRICE IN JAPAN OF PRODUCT α SOLD BY COMPANY A IS 500 YEN, THE PRICE IN JAPAN OF PRODUCT α SOLD BY COMPANY B IS 600 YEN, AND THE PLANNED PRICE IN JAPAN OF PRODUCT α SOLD BY US IS 300 YEN. THEREFORE, OUR PLANNED PRICE FOR PRODUCT α IS A COMPETITIVE PRICE. |
| $Y_2=g(100)$ | $X_5=100$ | THE KEY COMPONENT OF PRODUCT α SOLD BY US CAN BE IMPORTED AT ONE DOLLAR FOR ONE COMPONENT, BUT THE EXCHANGE RATE FOR THE NEXT HALF YEAR IS EXPECTED TO BE 100 YEN ±5 YEN TO THE DOLLAR. |
| $Y_3=h(100)$ | $X_5=100$ | A WEAKER YEN IS ADVANTAGEOUS WHEN EXPORTING PRODUCT α SOLD BY OUR COMPANY, BUT THE EXCHANGE RATE FOR THE NEXT HALF YEAR IS EXPECTED TO BE 100 YEN ±5 YEN TO THE DOLLAR. |
| . | . | . |
| . | . | . |

(51) Int. Cl.
G06N 7/00          (2006.01)
G06Q 40/06         (2012.01)

(56) References Cited

FOREIGN PATENT DOCUMENTS

| JP | 2013-012172 A  | 1/2013 |
| JP |      6592221 B1 | 9/2019 |
| KR | 20040029170 A  | 4/2004 |
| WO |     03023575 A2 | 3/2003 |

OTHER PUBLICATIONS

Extended European Search Report dated Mar. 17, 2021 in PCT Application No. PCT/JP2018/021689.
Examination Report dated Feb. 15, 2021 in Indian Application No. 202017051314.

\* cited by examiner

| MATHEMATICS EXPRESSION (MATHEMATICS EXPRESSION DATA) | OPERAND NUMERICAL VALUE (OPERAND NUMERICAL DATA) | BASIS (BASIS DATA) |
|---|---|---|
| $X_1 + X_2 = 1.0$ | $X_1 = 0.60$  $X_2 = 0.40$ | THE SHARE OF PRODUCT A IS CURRENTLY 60% FOR COMPANY A AND 40% FOR COMPANY B. |
| $Y_1 = X_1 / X_3 + X_2 / X_4 + X_2 + f(X_5)$ | $X_1 = 0.60$  $X_2 = 0.40$  $X_3 = 500$  $X_4 = 600$  $X_5 = 300$ | THE PRICE IN JAPAN OF PRODUCT α SOLD BY COMPANY A IS 500 YEN, THE PRICE IN JAPAN OF PRODUCT α SOLD BY COMPANY B IS 600 YEN, AND THE PLANNED PRICE IN JAPAN OF PRODUCT α SOLD BY US IS 300 YEN. THEREFORE, OUR PLANNED PRICE FOR PRODUCT α IS A COMPETITIVE PRICE. |
| $Y_2 = g(100)$ | $X_6 = 100$ | THE KEY COMPONENT OF PRODUCT α SOLD BY US CAN BE IMPORTED AT ONE DOLLAR FOR ONE COMPONENT, BUT THE EXCHANGE RATE FOR THE NEXT HALF YEAR IS EXPECTED TO BE 100 YEN ±5 YEN TO THE DOLLAR. |
| $Y_3 = h(100)$ | $X_6 = 100$ | A WEAKER YEN IS ADVANTAGEOUS WHEN EXPORTING PRODUCT α SOLD BY OUR COMPANY, BUT THE EXCHANGE RATE FOR THE NEXT HALF YEAR IS EXPECTED TO BE 100 YEN ±5 YEN TO THE DOLLAR. |
| . . . | . . . | . . . |

FIG. 6

FUTURE PREDICTION SIMULATION APPARATUS, METHOD, AND COMPUTER PROGRAM

CROSS-REFERENCE TO RELATED APPLICATION(S)

This application is a national stage application of International Patent Application No. PCT/JP2018/021689, filed Jun. 6, 2018, which is herein incorporated by reference in its entirety.

TECHNICAL FIELD

The present embodiments relate to a simulation technology for predicting the future.

BACKGROUND ART

If the future could be predicted, it would be possible for people to live a more meaningful life. For people who run a business or who invest money, being able to accurately predict the future would be very useful from the perspective of growing the business more smoothly or to improve investment results.

From such a point of view, simulation apparatus for the purpose of predicting the future, namely, future prediction simulation apparatus, are already being used in practice.

For example, the applicant of the present application has already achieved a future prediction simulation apparatus, and in certain fields, more precisely, in the pharmaceutical investment field, the applicant has already achieved such a share that it can be said to be a de facto standard.

A simulation generally obtains a result by substituting operand numerical values, which are numerical values representing various parameters that actually exist, into a mathematics expression obtained as a mathematical expression representing various events that actually exist, and performing an operation. It is to be understood that there are a plurality of the mathematics expressions and the operand numerical values, and the operation becomes complicated.

To give a specific example, the simulation apparatus achieved by the applicant is generally as follows.

The simulation apparatus provided by the applicant includes a first recorder configured to record at least one piece of mathematics expression data, which is data for specifying a mathematics expression required in order to execute a simulation for predicting a future, and at least one piece of operand numerical data, which is data for specifying an operand numerical value, which is a numerical value to be used in an operation when the operation is performed in accordance with the mathematics expression, both of the at least one piece of mathematics expression data and the at least one piece of operand numerical data being generated by a user. The simulation apparatus also includes a calculator configured to execute a simulation for predicting the future to generate prediction data, which is data relating to a prediction of the future, by using the operand numerical value specified by the operand numerical data recorded in the first recorder to perform an operation based on the mathematics expression specified by the mathematics expression data recorded in the first recorder.

The accuracy of a future prediction simulation result is influenced by how accurately the mathematics expressions represent real events and how accurately the operand numerical values represent real parameters. When the mathematics expressions and the operand numerical values are accurate, the results obtained by the future prediction simulation will be accurate and in line with the reality to appear in the future.

SUMMARY OF EMBODIMENTS

Technical Problem

However, there are cases in which the simulation result obtained by the future prediction simulation apparatus lacks accuracy. Such a situation tends to occur, for example, when the future to be predicted by the future prediction simulation apparatus extends over a long duration or is a future that is a certain time period away or more.

For example, when a change occurs in the external environment, correction is inherently required for the mathematics expressions and operand numerical values to be used by the future prediction simulation apparatus. For example, it is assumed that the target of the future prediction simulation is the growth potential of a venture company that manufactures and sells a certain product in relation to whether or not to invest in the venture company. To give just a few examples of the information that is required in order to perform the simulation, information on the existence of products from other companies that are similar to the product handled by the venture company, the price of the products from the other companies, the market share of the venture company product and the products from the other companies, the cost of procuring the raw materials for manufacturing the product, the costs involved in order to sell the product, the exchange rate such as dollar/yen and euro/yen, and the like is required. However, each of those circumstances changes over time. Therefore, it is required to correct the mathematics expressions and the operand numerical values in accordance with those changes.

However, in actual operation, correction of the mathematics expressions and the operand numerical values as described above is not often performed. The reason for this is that because the future prediction simulation performed by the future prediction simulation apparatus is relatively expensive, after the future prediction simulation has been performed once, the person performing the future prediction simulation does not want to perform it again.

However, even after the future prediction simulation has been performed in the future prediction simulation apparatus once, when a deviation between the obtained future prediction result and the reality that has actually occurred is too large, the mathematics expressions and the operand numerical values are sometimes corrected, and the future prediction simulation may be performed again. However, in the opinion of the inventors of the present application, a future prediction simulation that is performed again often fails because it is too late. This is because when the deviation between the future prediction simulation result and the reality that has actually occurred is already noticeable enough for the person performing the future prediction simulation using the future prediction simulation apparatus to notice that correction of the mathematics expressions and the operand numerical values is required, it is likely that the person running the business or investing money, for example, has already suffered large losses. The inventors of the present application believe that the original purpose of the future prediction simulation is lost in such a case.

The present embodiments may improve a future prediction simulation technology in order to more accurately predict the future by enabling a mathematics expression and an operand numerical value to be appropriately corrected.

Solution to Problem

In order to solve the above-mentioned problems, the inventors of the present application conducted research and development. As a result, the following knowledge was obtained.

As described above, the accuracy of a future prediction simulation result is influenced by how accurately the mathematics expressions represent real events and how accurately the operand numerical values represent real parameters. Therefore, the people involved in future prediction simulation technology are pouring their efforts into how to create the mathematics expressions and operand numerical values, or more precisely speaking, how to generate the mathematics expressions and operand numerical values so that those expressions and values accurately represent real events.

However, mathematics expressions and operand numerical values are merely so-called models of real events. The underlying grounds of such a model is the basis (because there are usually a plurality of "basis," the "basis" is generally a set of bases or minor bases) used to create the model. As a result, the mathematics expressions and the operand numerical values are created based on such a basis. In the present application, the term "basis" is almost synonymous with "hypothesis" for determining mathematics expressions and operand numerical values. The basis is a hypothesis or a story for creating the model, and is thus represented by text. Therefore, the people creating the mathematics expressions and operand numerical values for performing future prediction simulations are, prior to generating those correct mathematics expressions and operand numerical values, pouring their efforts into creating accurate bases.

However, the only factors directly used to predict the future by the future prediction simulation apparatus or that directly influence the future prediction are the mathematics expressions and the operand numerical values, but the basis for determining those mathematics expressions and operand numerical values is not included. Therefore, in a related-art future prediction simulation apparatus, the above-mentioned basis is recognized as being very important, but after the basis is created, and particularly after the mathematics expressions and the operand numerical values have been created based on the basis, the basis is not used. There are future prediction simulation apparatus that, in order to subsequently verify the kind of basis used to create a certain mathematics expression or operand numerical value, have a function for recording the data relating to the basis as a memorandum so that the person who created the mathematics expression or operand numerical value can keep a record of the basis, but the recorded basis is merely recorded.

However, the basis is, as already repeatedly described, the underlying grounds for determining the mathematics expressions and the operand numerical values, and it is clear that, when a change occurs, correction of the mathematics expressions and the operand numerical values is often required. Therefore, when basis data exists, it may be possible to correct the mathematics expressions and the operand numerical values at an appropriate timing by suitably utilizing that data.

The inventors of the present application created the present embodiments based on such knowledge.

The present embodiments are as follows.

According to one embodiment, there is provided a future prediction simulation apparatus including: a first recorder configured to record at least one piece of mathematics expression data, which is data for specifying a mathematics expression required in order to execute a simulation for predicting a future, and at least piece of one operand numerical data, which is data for specifying an operand numerical value, which is a numerical value to be used in an operation when the operation is performed in accordance with the mathematics expression, both of the at least one piece of mathematics expression data and the at least piece of one operand numerical data being generated by a user; and a calculator configured to execute a simulation for predicting the future to generate prediction data, which is data relating to a prediction of the future, by using the operand numerical value specified by the at least one of operand numerical data recorded in the first recorder to perform an operation based on the mathematics expression specified by the at least one of mathematics expression data recorded in the first recorder. This future prediction simulation apparatus may be the same as a related-art future prediction simulation apparatus.

Further, the future prediction simulation apparatus further includes: a second recorder configured to record basis data, which is text data generated by the user, for specifying a basis used by the user to determine the mathematics expression specified by the at least one piece of mathematics expression data recorded in the first recorder and the operand numerical value specified by the at least one piece of operand numerical data recorded in the first recorder; a related information collector configured to collect related information, which is information related to the basis specified by the basis data, from a predetermined search target; a determiner configured to determine whether the basis data is required to be corrected in terms of a relation with the related information collected by the related information collector; and an alerter configured to generate, when it is determined by the determiner that the basis data is required to be corrected, alert data, which is data for prompting the user to correct at least one of: the at least one piece of mathematics expression data; the at least one piece of operand numerical data; and the basis data.

The second recorder, the related information collector, the determiner, and the alerter included in the future prediction simulation apparatus according to one embodiment are not present in the related-art future prediction simulation apparatus. In particular, the related information collector, the determiner, and the alerter are not present in the related-art future prediction simulation apparatus.

The future prediction simulation apparatus according to one embodiment includes a second recorder configured to record basis data, which is text data regarding the basis for determining the mathematics expression and the operand numerical value. The future prediction simulation apparatus according to one embodiment further includes a related information collector configured to collect related information, which is information related to the basis specified by the basis data, from a predetermined search target. The related information collector collects related information every predetermined time interval (which are not necessarily equal time intervals), or constantly continues to collect related information. In the future prediction simulation apparatus according to one embodiment, the collected related information is used by a determiner configured to determine whether or not the basis data is required to be corrected in terms of a relation with the related information. When it is determined by the determiner of the future prediction simulation apparatus according to one embodiment that the basis data is required to be corrected, an alerter generates alert data, which is data for prompting the user to correct at least one of the mathematics expression data, the operand numerical data, and the basis data. The basis specified by basis data becomes the basis for determining the mathematics expression and the operand numerical value. When the basis is required to be corrected, it may also be required to correct the mathematics expression and the operand numerical value. Therefore, it is appropriate to set the timing at which it is determined by the determiner that the basis data is required to be corrected to the timing for generating the alert data, which is data for prompting the user to correct at least one of the mathematics expression data, the operand numerical data, and the basis data.

Based on the alert data, the user is prompted to correct at least one of the mathematics expression data, the operand numerical data, and the basis data. The user recognizes an alert based on the alert data by using any one of his or her five senses. When the related information is collected at least at an appropriate time interval, the determination by the determiner and the generation of the alert data by the alerter can be performed before a deviation between the future prediction simulation result and the reality that has actually occurred has already become noticeable. Therefore, the person (user) performing the future prediction simulation by using the future prediction simulation apparatus according to one embodiment can automatically receive the alert that at least one of the mathematics expression data, the operand numerical data, and the basis data is required to be corrected, based on the alert data, regardless of his or her intention, and before the occurrence of a large deviation like that described above, or to exaggerate a little, at the point in time when a sign of such a large deviation occurs.

When it is assumed that, the user corrects at least one of the mathematics expression data, the operand numerical data, and the basis data as required at the point in time at which the warning is received, as described above, it is possible to avoid the occurrence of a large deviation between the future prediction simulation result and reality, and it is possible to achieve a more accurate future prediction result.

The user is responsible for determining by the future prediction simulation apparatus according to one embodiment whether or not to correct at least one of the mathematics expression data, the operand numerical data, and the basis data, when the user receives an alert based on the alert data. With the future prediction simulation apparatus according to one embodiment, even when alert data is generated, none of the mathematics expression data, the operand numerical data, or the basis data may be corrected.

The future prediction simulation apparatus according to one embodiment includes, as described above, a related information collector configured to collect related information, which is information related to the basis specified by the basis data.

The related information collector may use any method to specify the related information. For example, the future prediction simulation apparatus according to one embodiment may further include an interpreter configured to interpret, based on the basis data, a meaning of the basis specified by the basis data to generate interpretation data, which is data corresponding to the meaning of the basis. In such a case, the related information collector may be configured to collect the related information based on the interpretation data generated by the interpreter. The basis data is, as described above, text data. Therefore, the interpretation data can be generated by interpreting the meaning of the text data. The related information collector collects related information based on the interpretation data generated in such a way, and as a result, the related information collected by the related information collector is closely related to the basis specified by the basis data.

The information "related" to the basis specified by the basis data is, for example, information including the same word as a word included in the basis data, or information including word that is the opposite of a word included in the basis data. However, those pieces of information are all examples, and the above-mentioned range determined to be "related" can be appropriately defined using a publicly-known or a well-known technique used in the field of inter-document relation analysis, such as "doc2vec".

The related information collector may be configured to collect the related information from among pieces of information recorded in specific recording means designated in advance. In this case, information selected in advance by, for example, the user or a person who has received a request from the user, is recorded in the specific recording means. The related information collector may be configured to collect related information from among the information created in such a way recorded in the specific recording means.

Meanwhile, the related information collector maybe configured to collect the related information from among pieces of information existing on the Internet. In this case, the related information collector collects the related information by so-called crawling the Internet.

The determiner may be configured to automatically determine at a predetermined timing whether or not the basis data is required to be corrected. For example, the accuracy of the future prediction simulation by the future prediction simulation apparatus can be maintained at a high level by performing the determination by the determiner as described above at an appropriate timing, such as once a week or once a month.

The predetermined timing may be, for example, freely settable by the user, or may be changeable by the user. The predetermined timing may or may not be a fixed interval. The timing at which the determiner performs the determination may be set independently of the timing at which the related information collector collects the related information.

The alerter may be configured to immediately generate the alert data when it is determined by the determiner that the basis data is required to be corrected. As a result, an alert based on the alert data can be quickly provided to the user when there is a situation requiring at least one of the mathematics expression data, the operand numerical data, and the basis data to be corrected.

The future prediction simulation apparatus according to one embodiment maybe connected to a predetermined display having a function of displaying an image. In this case, the future prediction simulation apparatus may include an image generator configured to generate, based on the alert data generated by the alerter, image data for the alert image, which is an image for visually informing the user that it is required to correct at least one of: the at least one piece of mathematics expression data; the at least one piece of operand numerical data; and the basis data, and the future prediction simulation apparatus may be configured to inform the user that it is required to correct at least one of: the at least one piece of mathematics expression data; the at least one piece of operand numerical data; and the basis data by displaying on the display the alert image based on the image data generated by the image generator. Such a future prediction simulation apparatus is typically a personal computer owned by the user or installed relatively close to the user.

Meanwhile, the future prediction simulation apparatus according to one embodiment may further include communication means for communicating via a predetermined network to and from a predetermined computer to be operated by the user and connected to a predetermined display having a function of displaying an image. The communication means may be configured to: transmit the alert data generated by the alerter to the predetermined computer to be operated by the user; and inform the user that at least one of: the at least one piece of mathematics expression data; the at least one piece of operand numerical data; and the basis data is required to be corrected by displaying on the display of the predetermined computer an alert image, which is an image for visually informing, based on the alert data, the user that it is required to correct at least one of: the at least one piece of mathematics expression data; the at least one piece of operand numerical data; and the basis data. In this case, the predetermined computer operated by the user is typically a personal computer owned by the user or installed relatively close to the user, and the future prediction simulation apparatus is typically a computer device present in a cloud. Thus, the future prediction simulation apparatus according to the present embodiments can be an apparatus employed so-called cloud technology.

Independently of how the future prediction simulation apparatus may be configured, the alert image is visually informing the user that the basis data is required to be corrected in the state of specifying which portion of the basis data is required to be corrected. The user can more accurately understand which portion of the basis data, the mathematics expression data, and the operand numerical data is required to be corrected by being informed of which portion of the basis data is required to be corrected. This contributes to an increase in the accuracy of the future prediction simulation result obtained by the future prediction simulation apparatus.

The inventors of the present application also propose a method to be executed by a future prediction simulation apparatus as a mode of the present embodiments. The effects of that method are the same as the effects of the future prediction simulation apparatus according to one embodiment.

As an example, the method is executed by the future prediction simulation apparatus including: a first recorder configured to record at least one piece of mathematics expression data, which is data for specifying a mathematics expression required in order to execute a simulation for predicting a future, and at least one piece of operand numerical data, which is data for specifying an operand numerical value, which is a numerical value to be used in an operation when the operation is performed in accordance with the mathematics expression, both of the at least one piece of mathematics expression data and the at least one piece of operand numerical data being generated by a user; and a calculator configured to execute a simulation for predicting the future to generate prediction data, which is data relating to a prediction of the future, by using the operand numerical value specified by the at least one piece of operand numerical data recorded in the first recorder to perform an operation based on the mathematics expression specified by the at least one piece of mathematics expression data recorded in the first recorder.

Further, the method includes : a step of recording, into a second recorder, basis data, which is text data generated by the user, for specifying a basis used by the user to determine the mathematics expression specified by the at least one piece of mathematics expression data recorded in the first recorder and the operand numerical value specified by the at least one piece of operand numerical data recorded in the first recorder; a related information collection step of collecting related information, which is information related to the basis specified by the basis data, from a predetermined search target; a determination step of determining whether the basis data is required to be corrected in terms of a relation with the related information collected in the related information collection step; and an alert step of generating, when it is determined in the determination step that the basis data is required to be corrected, alert data, which is data for prompting the user to correct at least one of: the at least one piece of mathematics expression data; the at least one piece of operand numerical data; and the basis data.

The inventors of the present application also propose a computer program for causing a predetermined general-purpose computer to function as a future prediction simulation apparatus as a mode of the present embodiments. The effects of the computer program are the same as the effects of the future prediction simulation apparatus according to one embodiment, and the fact that it becomes possible for a predetermined computer to function as the future prediction simulation apparatus according to one embodiment of the present application is also an effect of such a computer program.

As an example, the computer program is a computer program for causing a predetermined computer to function as a future prediction simulation apparatus.

Further, the computer program is a computer program for causing the predetermined computer to function as: a first recorder configured to record at least one piece of mathematics expression data, which is data for specifying a mathematics expression required in order to execute a simulation for predicting a future, and at least one piece of operand numerical data, which is data for specifying an operand numerical value, which is a numerical value to be used in an operation when the operation is performed in accordance with the mathematics expression; and a calculator configured to execute a simulation for predicting the future to generate prediction data, which is data relating to a prediction of the future, by using the operand numerical value specified by the at least one piece of operand numerical data recorded in the first recorder to perform an operation based on the mathematics expression specified by the at least one piece of mathematics expression data recorded in the first recorder; a second recorder configured to record basis data, which is text data generated by the user, for specifying a basis used by the user to determine the mathematics expression specified by the at least one piece of mathematics expression data recorded in the first recorder and the operand numerical value specified by the at least one piece of operand numerical data recorded in the first recorder; a related information collector configured to collect related information, which is information related to the basis specified by the basis data, from a predetermined search target; a determiner configured to determine whether the basis data is required to be corrected in terms of a relation with the related information collected by the related information collector; and an alerter configured to generate, when it is determined by the determiner that the basis data is required to be corrected, alert data, which is data for prompting the user to correct at least one of: the at least one piece of mathematics expression data; the at least one piece of operand numerical data; and the basis data.

BRIEF DESCRIPTION OF DRAWINGS

FIG. 6 is a table for schematically showing an example of data recorded in a server recorder of the server illustrated in FIG. 1;

DESCRIPTION OF EMBODIMENTS

There is now described a preferred embodiment with reference to the drawings.

Figure 1:
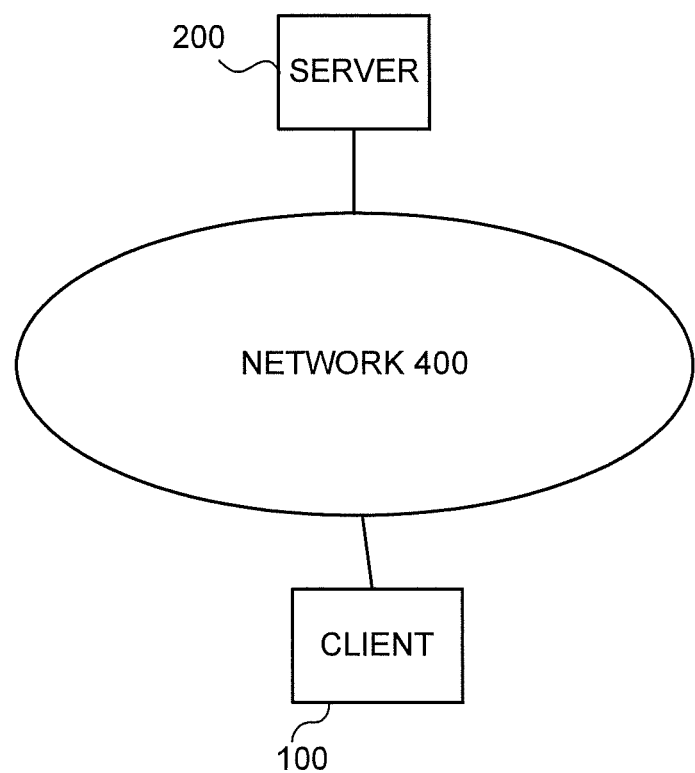
FIG. 1 is a diagram for illustrating an overall configuration of a system including a server serving as a future prediction simulation apparatus according to one embodiment.

FIG. 1 is a diagram for schematically illustrating an overall configuration of a system including a future prediction simulation apparatus according to a preferred embodiment.

The system according to the embodiment includes a client 100 and a server 200. Each of those components is connectable to a network 400.

Examples of the network 400 are not particularly limited, but in this embodiment the network 400 is the Internet.

The client 100 in this embodiment is operated by a user, and is, for example, the personal property of the user or the property of a company to which the user belongs. Further, the server 200 in this embodiment corresponds to the future prediction simulation apparatus as referred to in the present application.

The client 100 includes a computer. More specifically, the client 100 in this embodiment is built from a general-purpose computer.

Next, a configuration of the client 100 is described.

The client 100 is, as described above, a general-purpose computer, and may be a smartphone, a tablet, a laptop computer, a desktop computer, or the like. All of those components are capable of communicating via the network 400. The client 100 is also required to be capable of generating function blocks (described later) in the client 100 by installing a computer program (described later), and executing processing (described later). As long as the client 100 is capable of performing those tasks, the other specifications of the client 100 are not particularly limited. The client 100 may be a commercially available computer.

For example, when the client 100 is a smartphone or a tablet, as a smartphone, the client 100 may be, for example, an iPhone manufactured and sold by Apple Japan GK, and as a tablet, the client 100 may be, for example, an iPad manufactured and sold by Apple Japan GK. When the client 100 is built from a laptop computer, a desktop computer, or the like, those devices may be a commercially available device. There is now described a case in which the client 100 is a smartphone, but the present embodiments are not limited thereto.

Figure 2:
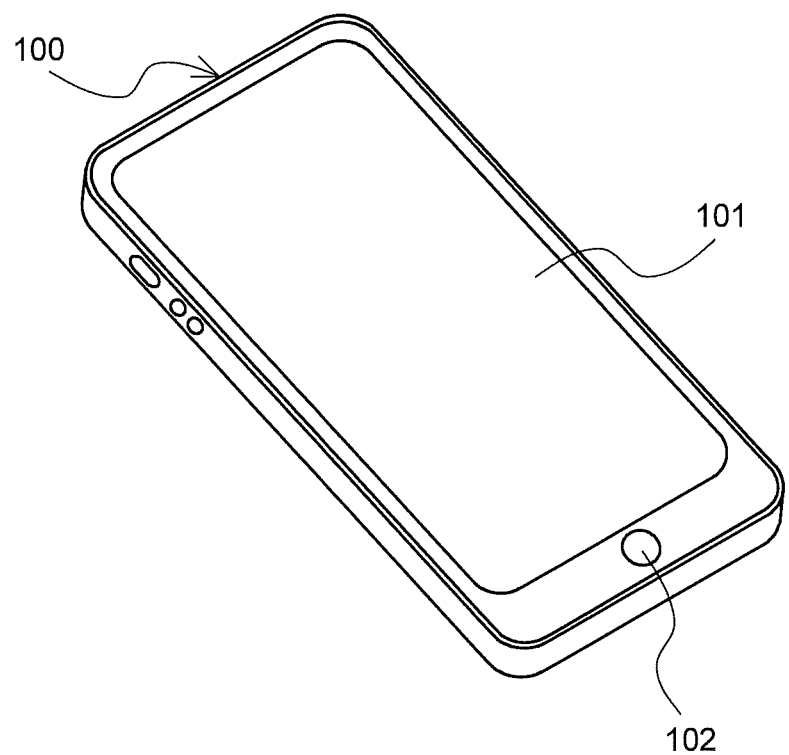
FIG. 2 is a diagram for illustrating an appearance of a client included in the system illustrated in FIG. 1.

An example of the appearance of the client 100 is illustrated in FIG. 2.

The client 100 includes a display 101. The display 101 is used for displaying a still image or a moving image, and a publicly-known or a well-known display may be used. The display 101 is, for example, a liquid crystal display. The display 101 may be externally attached to the client 100. When the client 100 is a desktop computer, the display 101 is likely to be an external type display.

The client 100 also includes an input device 102. The input device 102 is used by the user to perform desired input to the client 100. As the input device 102, a publicly-known or a well-known input device may be used. The input device 102 of the client 100 in this embodiment is a button type input device, but the input device 101 is not limited thereto, and a numeric keypad, a keyboard, a trackball, a mouse, a well-known audio input using a microphone terminal, and the like may also be used. In particular, when the client 100 is a laptop computer or desktop computer, the input device 102 is likely to be a keyboard, a mouse, or the like. When the display 101 is a touch panel, the display 101 also acts as the input device 102, which is the case in this embodiment.

Figure 3:
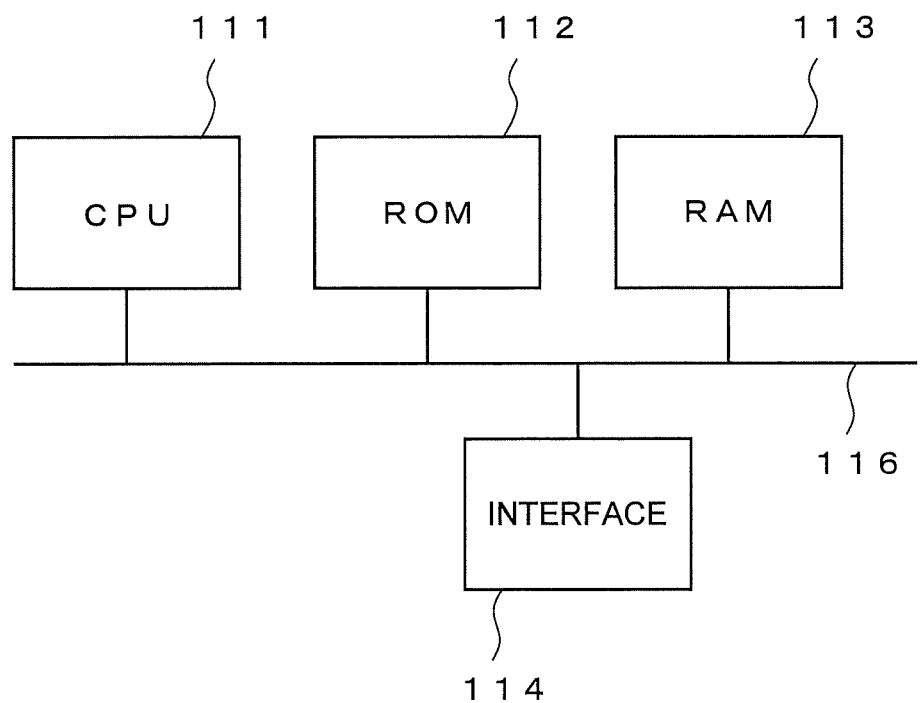
FIG. 3 is a diagram for illustrating a hardware configuration of the client included in the system illustrated in FIG. 1.

A hardware configuration of the client 100 is illustrated in FIG. 3.

The hardware includes a central processing unit (CPU) 111, a read-only memory (ROM) 112, a random-access memory (RAM) 113, and an interface 114, which are mutually connected to one another by a bus 116.

The CPU 111 is an arithmetic device configured to perform an arithmetic operation. The CPU 111 executes processing to be described later by executing, for example, a computer program recorded in the ROM 112 or the RAM 113. Although not shown, the hardware may include a hard disk drive (HDD) or other large-capacity recording device, and the computer program maybe recorded in the large-capacity recording device.

The computer program herein includes at least a computer program for causing the client 100 to execute processing to be described later (e.g., processing for displaying image to be described later on display 101). The computer program may be preinstalled on the client 100 or may be installed on the client 100 after shipment. The computer program may be installed on the client 100 via a predetermined recording medium such as a memory card, or may be installed via a network such as a LAN or the Internet.

The ROM 112 records computer programs and data required in order for the CPU 111 to execute the processing to be described later. The computer program recorded in the ROM 112 is not limited thereto. When the client 100 is a smartphone, a computer program or data for executing, for example, a call or an electronic mail required in order for the client 100 to function as a smartphone is recorded. The client 100 is also capable of browsing web pages based on data received via the network 400, and includes a publicly-known web browser for that purpose.

The RAM 113 provides a work area required in order for the CPU 111 to perform processing. In some cases, (a part of) the above-mentioned computer program or data may be recorded.

The interface 114 exchanges data between the outside and the CPU 111, the RAM 113, and the like, which are connected via the bus 116. The display 101 and the input device 102 are connected to the interface 114. Details of an operation input from the input device 102 are input to the bus 116 from the interface 114. As is well known, image data for displaying an image on the display 101 is transmitted to the interface 114 via the bus 116, and output from the interface 114 to the display 101. The interface 114 is also connected to a transmission/reception mechanism (not shown), which is publicly-known means for performing communication to and from the outside via the network 400, which is the Internet. This enables the client 100 to transmit data via the network 400 and to receive data via the network 400. The data may be transmitted or received via the network 400 in a wired or wireless manner. For example, when the client 100 is a smartphone, such communication is typically performed wirelessly. As long as such transmission and reception can be performed, the configuration of the transmission/reception mechanism may be a publicly-known or a well-known configuration. The data received by the transmission/reception mechanism from the network 400 is received by the interface 114, and the data passed from the interface 114 to the transmission/reception mechanism is transmitted to the outside via the network 400, for example, to the server 200 via the network 400 in relation to this embodiment.

Figure 4:
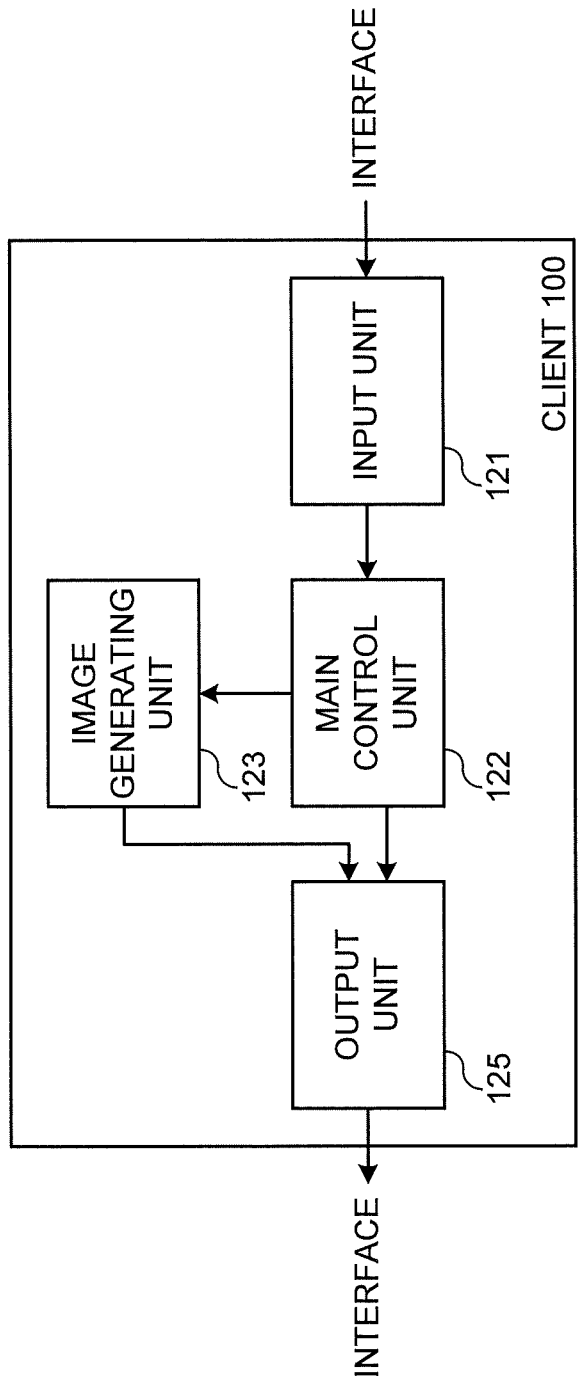
FIG. 4 is a block diagram for illustrating function blocks generated in the client included in the system illustrated in FIG. 1.

When the CPU 111 executes the computer program, function blocks like those illustrated in FIG. 4 are generated in the client 100. The following function blocks maybe generated by the functions of the above-mentioned computer program alone for causing the client 100 to execute processing such as that described later, or may also be generated by the above-mentioned computer program and an OS or another computer program installed in the client 100 working together in cooperation.

In the client 100, in terms of a relation with the functions of the present embodiments, an input unit 121, a main control unit 122, an image generating unit 123, and an output unit 125 are generated.

The input unit 121 receives inputs from the interface 114.

The inputs to the input unit 121 from the interface 114 may include an input from the input device 102. Examples of the input from the input device 102 include start data, setting selection data, mathematics expression data, operand numerical data, and basis data. All of those data are described in detail later. When those inputs have been input from the input device 102, all of the data from those inputs is transmitted from the input unit 121 to the main control unit 122.

The data input from the interface 114 to the input unit 121 also includes data transmitted from the server 200 and received by the transmission/reception mechanism. Such data includes, for example, image data for an alert image to be described later, and image data for a result image to be described later, which is an image regarding a result of the future prediction simulation. When the image data is received by the input unit 121 via the transmission/reception mechanism and the interface 114, the input unit 121 transmits the image data to the main control unit 122.

The main control unit 122 performs overall control of each of the function blocks generated in the client 100.

The main control unit 122 may receive the start data, the setting selection data, and simulation execution data from the input unit 121. When the start data, the setting selection data, and the simulation execution data are received, the main control unit 122 transmits those data to the output unit 125 and the image generating unit 123. Similarly, the main control unit 122 may receive the mathematics expression data, the operand numerical data, and the basis data from the input unit 121. When those data are received, the main control unit 122 transmits those data to each of the output unit 125 and the image generating unit 123.

The main control unit 122 may also receive, via the input unit 121, image data for images including an alert image and a result image transmitted from the server 200. When such image data is received, the main control unit 122 transmits the image data to the image generating unit 123.

The image generating unit 123 has a function of generating image data for displaying an image on the display 101, or adjusting the image data transmitted from the server 200 such that the image data can be displayed on the display 101 (for the sake of simplicity, such processing may also be referred to as "generating image data").

The image generating unit 123 may receive the start data, the setting selection data, the simulation execution data, the mathematics expression data, the operand numerical data, and the basis data from the main control unit 122. When such data is received, the image generating unit 123 generate image data for an image corresponding to the input data, for example, image data for an image that enables the user to grasp the fact that each of those data has been input.

The image generating unit 123 may receive from the main control unit 122 the image data transmitted from the server 200. When the image data is received, the image generating unit 123 generates image data corresponding to that image data.

In any case, the image data generated by the image generating unit 123 is transmitted from the image generating unit 123 to the output unit 125.

The output unit 125 outputs to the interface 114 the data generated by the function blocks in the client 100.

As described above, the start data, the setting selection data, the simulation execution data, the mathematics expression data, the operand numerical data, and the basis data may be transmitted to the output unit 125 from the main control unit 122. The output unit 125, which has received such data, transmits the data to the transmission/reception mechanism via the interface 114. The transmission/reception mechanism transmits the data to the server 200 via the network 400.

As described above, image data may be transmitted to the output unit 125 from the image generating unit 123. The image data is transmitted from the output unit 125 to the display 101 via the interface 114. An image based on the image data is displayed on the display 101, which has received the image data.

Next, the configuration of the server 200 is described.

When viewed as hardware, the server 200 may be an existing publicly-known or well-known server, and in particular, may be a cloud server. The hardware configuration may be a general configuration, and roughly speaking, follows the hardware configuration of the client 100, in which the CPU 111, the ROM 112, the RAM 113, and the interface 114 are connected by the bus 116. However, the server 200 generally has an HDD or other large-capacity recording device.

The configuration and function of each of the CPU, the ROM, the RAM, the interface, the bus, and the large-capacity recording device included in the server 200 are similar to those in the client 100. The interface included in the server 200 is connected to a transmission/reception mechanism, which is similar to that included in the client 100, for performing communication to and from devices outside the server 200 via the network 400. Information transmitted to the interface via the bus is transmitted to the transmission/reception mechanism, and transmitted from the transmission/reception mechanism via the network 400 to, for example, the client 100. The data transmitted from the client 100 via the network 400 and received by the transmission/reception mechanism is transmitted from the transmission/reception mechanism to the interface, and transmitted from the interface to the bus.

A display and an input device similar to those included in the client 100 may be connected to the interface included in the server 200. However, those parts are not particularly relevant to the subject application, and thus a description thereof is omitted here.

Function blocks like those described below are generated in the server 200 by executing a computer program, which is recorded in the ROM, large-capacity recording device, or the like in the server 200, for causing the server 200 to function as the future prediction simulation apparatus according to the present embodiments. The following function blocks may be generated by the functions of the computer program alone for causing the server 200 to function as the future prediction simulation apparatus according to the present embodiments, or may also be generated by that computer program and an OS or another computer program installed in the server 200 working together in cooperation. The computer program may be preinstalled on the server 200, or may be installed on the server 200 after shipment. In that case, the computer program may be installed on the server 200 via a predetermined recording medium such as a memory card, or may be installed via a network such as a LAN or the Internet. These matters are the same as in the case of the client 100.

Figure 5:
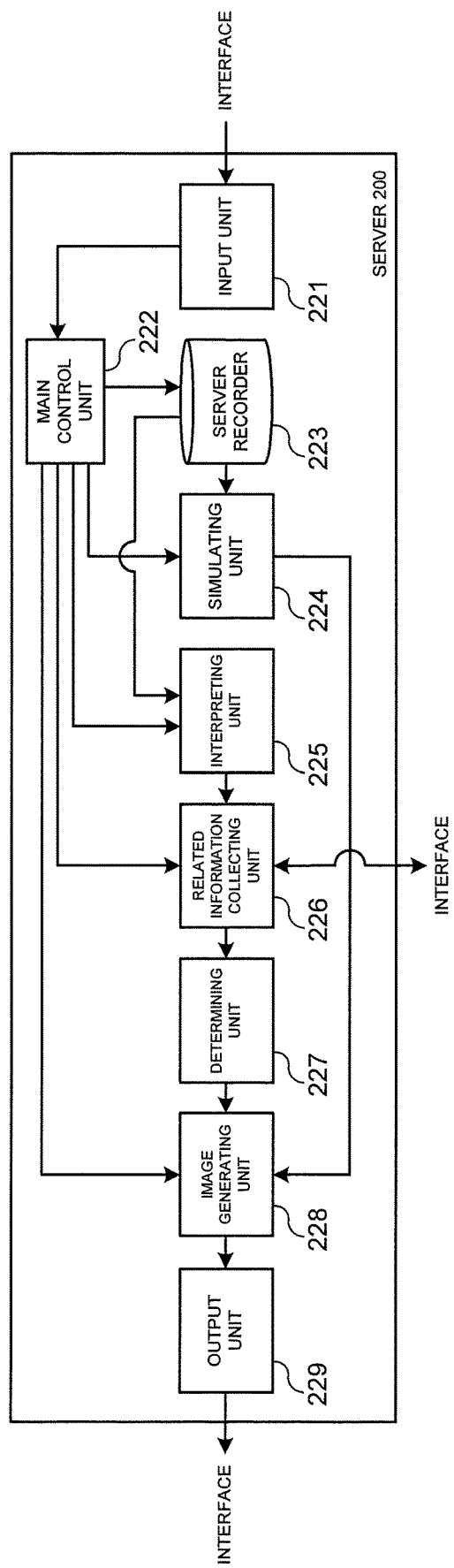
FIG. 5 is a block diagram for illustrating function blocks generated in the server included in the system illustrated in FIG. 1.

In the server 200, in terms of a relation with the functions of the present embodiments, an input unit 221, a main control unit 222, a server recorder 223, a simulating unit 224, an interpreting unit 225, a related information collecting unit 226, a determining unit 227, an image generating unit 228, and an output unit 229 are generated (FIG. 5).

The input unit 221 receives inputs from the interface.

The data input from the interface to the input unit 221 is data transmitted from the client 100 via the network 400 and received by the transmission/reception mechanism of the server 200.

Start data, setting selection data, simulation execution data, mathematics expression data, operand numerical data, and basis data may be transmitted to the transmission/reception mechanism from the client 100. The transmission/reception mechanism receives such data, and transmits the data to the input unit 221. The input unit 221 receives the data, and transmits the received data to the main control unit 222.

The main control unit 222 performs overall control of each of the function blocks generated in the server 200.

The main control unit 222 may receive the start data, the setting selection data, the simulation execution data, the mathematics expression data, the operand numerical data, and the basis data from the input unit 221. Of those, when the start data and the setting selection data are received, the main control unit 222 transmits an instruction to the image generating unit 228 to generate appropriate image data, which is described later. When the simulation execution data is received, the main control unit 222 transmits an instruction to the simulating unit 224 to execute the future prediction simulation. When the mathematics expression data, the operand numerical data, and the basis data are received, the main control unit 222 transmits those data to the server recorder 223.

The main control unit 222 of this embodiment may also be configured to notify, when there has been a change (initial writing or subsequent correction) in the basis data recorded in the server recorder 223, the interpreting unit 225 of that change, and to output to the related information collecting unit 226 an instruction to collect related information, which is described later. However, the main control unit 222 is not limited to this configuration.

As described above, the server recorder 223 receives the mathematics expression data, the operand numerical data, and the basis data from the main control unit 222. The server recorder 223 records those data when the server recorder 223 receives the mathematics expression data, the operand numerical data, and the basis data from the main control unit 222.

Of the data recorded in the server recorder 223, the mathematics expression data is data generated by the user, and is data for specifying the mathematics expression required to execute the future prediction simulation for predicting the future. The mathematics expression is, for example, a basic arithmetic operation or a logic operation, or a suitable combination thereof. Of course, the mathematics expression is not limited to one mathematics expression, and in practice the mathematics expression is a plurality of expressions.

Among the data recorded in the server recorder 223, the operand numerical data is data generated by the user, and is data for specifying an operand numerical value, which is a numerical value to be used when executing an operation using the mathematics expression to execute the future prediction simulation for predicting the future.

The mathematics expression, the operand numerical value, the mathematics expression data, and the operand numerical data are all publicly known or well known, and can each be modeled after publicly-known or well-known examples thereof.

Of the data recorded in the server recorder 223, the basis data is data created by the user, and is data for specifying the basis used by the user in order to determine the mathematics expression specified by the mathematics expression data recorded in the server recorder 223 and the operand numerical value specified by the operand numerical data recorded in the server recorder 223. The basis is, for example, a hypothesis for executing the future prediction simulation, and is described as text (in sentences). More specifically, the basis data is text data that can be understood by the user.

In this embodiment, the operand numerical data recorded in the server recorder 223 is recorded in the server recorder 223 in such a state that the operand numerical value specified by the operand numerical data is linked to the mathematics expression data for specifying the mathematics expression to be used for the operation. In the server recorder 223, a region in which the mathematics expression data and the operand numerical data are recorded is a first recorder as referred to in the present embodiments.

The basis data recorded in the server recorder 223 is recorded in association with the mathematics expression data and the operand numerical data, which are linked to each other and specify the mathematics expression and the operand numerical value determined based on the basis data.

In the server recorder 223, a region in which the basis data is recorded is a second recorder as referred to in the present embodiments.

A specific example of part of the mathematics expression data, the operand numerical data, and the basis data recorded in the server recorder 223 is schematically shown in FIG. 6.

In FIG. 6, the leftmost column shows the mathematics expression specified by the mathematics expression data. To the right of that is shown an operand numerical value specified by the operand numerical data, which is to be used when performing the operation based on the above-mentioned mathematics expression. Those mathematics expression and operand numerical value are linked to each other by being arranged side by side. For example, in an operation using the mathematics expression "$X_1+X_2=1.0$", the operand numerical values "$X_1=0.60\ X_2=0.40$" are used, and in an operation using "$Y_2=g\ (100)$", the operand numerical value "$X_6=100$" is used. In this example, "g" represents a certain function, and "h" in the row below that is the same.

In FIG. 6, the rightmost column shows the basis specified by the basis data. The mathematics expression and the operand numerical value positioned to the left of the basis are the mathematics expression and the operand numerical value determined based on that basis. For example, the mathematics expression "$X_1+X_2=1.0$" and the operand numerical value "$X_1=0.60\ X_2=0.40$" are determined based on the basis "the share of product a is currently 60% for company A and 40% for company B." In this embodiment, each example of the basis is different, but it is possible to create a plurality of pairs of mathematics expressions and operand numerical values from a certain common basis. In that case, several texts shown in the basis column are the same.

The mathematics expressions, the operand numerical values, and the bases shown in FIG. 6 are all merely examples, and may not all be useful for executing an accurate future prediction simulation. They are merely examples to help understand what the mathematics expression, the operand numerical value, and the basis are specifically like.

The simulating unit 224 has a function of executing the future prediction simulation. The future prediction simulation performed by the simulating unit 224 is a simulation for the purpose of predicting the future, and is determined based on the mathematics expressions and the operand numerical values described above. The future prediction simulation is, for example, a simulation for predicting the sales of a certain product, a simulation for predicting the growth potential of a certain company, or a simulation for predicting the growth potential of a certain business.

The simulating unit 224 may receive an instruction from the main control unit 222 to execute the future prediction simulation as described above. When such an instruction is received, the simulating unit 224 executes the future prediction simulation. When executing the future prediction simulation, the simulating unit 224 reads the mathematics expression data and the operand numerical data from the server recorder 223, and executes future prediction simulation by using the mathematics expression and operand numerical value specified thereby. The method of the future prediction simulation executed using the mathematics expression and the operand numerical value may be similar to a publicly-known or a well-known method.

The data for predicting the future, which is generated by the simulating unit 224 performing the future prediction simulation, is the result data. In this embodiment, the result data is transmitted from the simulating unit 224 to the image generating unit 228.

The interpreting unit 225 is used for generating interpretation data.

The interpretation data is data corresponding to the meaning of the basis specified by the basis data recorded in the above-mentioned server recorder 223.

When there is a change in basis data recorded in the server recorder 223, the interpreting unit 225 is notified of that fact from the main control unit 222. The interpreting unit 225 receives the notification, reads all of the basis data recorded in the server recorder 223, and generates interpretation data for each basis specified by each basis data. The interpreting unit 225 generates interpretation data each time there is a change in the basis data, and hence the interpretation data generated by the interpreting unit 225 is in line with the latest basis data recorded in the server recorder 223. However, the interpreting unit 225 is not limited to such a configuration. The interpreting unit 225 may automatically generate interpretation data at predetermined time intervals, for example, in which case the notification from the main control unit 222 to the interpreting unit 225 is not required.

After the interpretation data is generated, the interpreting unit 225 transmits the generated interpretation data to the related information collecting unit 226. In this embodiment, the interpreting unit 225 transmits the interpretation data as well as the basis data from which the interpreting unit 225 originates to the related information collecting unit 226. However, the interpreting unit 225 is not limited to such a configuration.

The related information collecting unit 226 has a function of collecting related information, which is information related to the basis specified by the basis data from a predetermined search target.

The related information collecting unit 226 in this embodiment collects, by using the interpretation data received from the interpreting unit 225, related information as information related to the meaning of the basis specified by the interpretation data.

In this embodiment, the related information collecting unit 226 searches the Internet to collect related information. However, the search target is not limited to the Internet. More specifically, the related information collecting unit 226 is capable of accessing data on the Internet via the interface and the transmission/reception mechanism, to thereby collect the related information. The related information collecting unit 226 can collect the related information from data existing on the Internet based on so-called crawling, which itself is a publicly-known or a well-known technique. The related information collecting unit 226 can search data recorded in a recording device present in the server 200 or outside the server 200 to collect the related information. For example, an administrator of the server 200, the user of the client 100, or a person asked by the administrator of the server 200 or the user of the client 100 can record data (e.g., news article from website of specific newspaper company), which is assumed to include related information, in the above-mentioned recording device in advance or periodically, for example, and the related information collecting unit 226 can search the data recorded in that recording device to collect related information.

The range that the related information collecting unit 226 determines to be "related" can be appropriately defined using a publicly-known or a well-known technique used in the field of inter-document relation analysis, such as "doc2vec". The "related" information is, for example, information on content different from basis data or the interpretation data, which includes a word having a relation defined in advance (e.g., relation that is higher-level, lower-level, reverse meaning, formational, encompassing, inclusive, approximate, or opposite) to a "word" constituting the text of the basis specified by the basis data or a "word" included in the interpretation data generated from the basis data.

When the related information collecting unit 226 finds related information, the related information collecting unit 226 transmits the found related information to the determining unit 227. In this embodiment, when the related information collecting unit 226 transmits related information to the determining unit 227, the related information is transmitted to the determining unit 227 in a state in which the related information is linked to the basis data regarding the basis relating to that related information or to interpretation data generated based thereon. However, this embodiment is not limited to this processing.

The determining unit 227 has a function of determining, in terms of the relation with the above-mentioned related information collected by the related information collecting unit 226, whether or not the basis data is required to be corrected.

As described above, the determining unit 227 may receive from the related information collecting unit 226 the related information and the basis data (including interpretation data generated from each basis data). The determining unit 227 in this embodiment determines, when the related information is received from the related information collecting unit 226, that the basis data specifying the basis related to the related information is required to be corrected. However, the present embodiment is not limited to this processing. The determination method of the determining unit 227 may be another method, in which when the related information is received, the determining unit 227 again performs a determination of whether or not the related information has an influence sufficient to require correction of the basis data. Such a determination can be implemented by a publicly-known or a well-known method, for example, by a method called observation of changes in degree of relation of doc2vec.

The determining unit 227 generates, when it is determined that the basis data is required to be corrected, alert data, which is data for prompting the user of the client 100 to correct the mathematics expression data or the operand numerical data for specifying at least a part of the basis data, or a mathematics expression or operand numerical value generated based on the basis specified by that basis data. After the alert data is generated, the determining unit 227 transmits the alert data to the image generating unit 228.

The image generating unit 228 has a function of generating image data, which is data regarding an image to be displayed on the display 101 of the client 100.

Other image data is also generated by the image generating unit 228, but representative examples of the image data generated by the image generating unit 228 are the image data regarding the result image and the alert image.

As described above, the image generating unit 228 may receive result data from the simulating unit 224. When the result data is received, the image generating unit 228 generates image data for the result image, which is an image displaying the result of the future prediction simulation.

As described above, the image generating unit 228 may receive alert data from the determining unit 227. When the alert data is received, the image generating unit 228 generates image data for the alert image, which is an image for prompting the user to correct at least one of the mathematics expression data, the operand numerical data, and the basis data. The image data enables the user to grasp, based on the alert image specified by the image data, what part of the basis data is required to be corrected.

In any case, the image data generated by the image generating unit 228 is transmitted to the output unit 229.

The output unit 229 outputs the data generated by the function blocks in the server 200 to the interface.

As described above, image data may be transmitted from the image generating unit 228 to the output unit 229. When image data is received, the output unit 229 transmits the image data to the transmission/reception mechanism via the interface. The image data is transmitted from the transmission/reception mechanism to the client 100 via the network 400.

Next, use and operation of the system described above, in particular, use and operation of the server 200 as a future prediction simulation apparatus according to the present embodiments are described.

First of all, a user intending to use the service by the server 200 as a future prediction simulation apparatus generates mathematics expression data, operand numerical data, and basis data. Initially, none of the mathematics expression data, the operand numerical data, or the basis data is recorded in the server recorder 223 of the server 200.

Specifically, first of all, the user operates the input device 102 of the client 100 and inputs start data. When the start data has been input, the start data is transmitted from the interface 114 to the input unit 121, and then transmitted from the input unit 121 to the main control unit 122. The main control unit 122 transmits the start data to the output unit 125. The start data is transmitted to the transmission/reception mechanism from the output unit 125 via the interface 114, and is then transmitted to the server 200 from the transmission/reception mechanism via the network 400. In order to authenticate the client 100 at the server 200 side, data other than the start data, such as a unique user ID or a password for each user, may also be transmitted from the client 100 to the server 200.

The server 200 receives the start data at its transmission/reception mechanism. The start data received by the server 200 is transmitted from the interface to the main control unit 222 via the input unit 221. When the start data is received, the main control unit 222 transmits to the image generating unit 228 an instruction to generate a top image, which is an image corresponding to the fact that start data has been input. The image generating unit 228 receives the instruction, and generates image data, which is the data of the top image. The contents of the top image are described later. The image data is transmitted from the image generating unit 228 to the output unit 229, and then transmitted from the output unit 229 to the transmission/reception mechanism. The image data is then transmitted to the client 100 from the transmission/reception mechanism via the network 400. The client 100 receives the image data at its transmission/reception mechanism.

In the client 100, the image data is transmitted to the main control unit 122 from the transmission/reception mechanism via the interface 114 and the input unit 121. When the image data is received, the main control unit 122 transmits the image data to the image generating unit 123. The image generating unit 123 generates image data for a top image, and transmits the generated image data to the output unit 125. The output unit 125 transmits that image data to the display 101.

As a result of this processing, the top image is displayed on the display 101. The top image is, for example, an image like that illustrated in FIG. 7. The top image includes two button images. On one of those button images, the word "setting" is written, and on the other button image, the words "execute simulation" are written. When the user clicks the "setting" button image by operating the input unit 121, the computer program executed by the client 100 transitions to a mode that lets the user input the mathematics expression data, the operand numerical data, and the basis data. Meanwhile, when the user clicks the "execute simulation" button image, the future prediction simulation is executed by the server 200 in the manner described later. Specifically, under a state in which the top image is displayed on the display 101, the user performs input for selecting any one of the above-mentioned two buttons. When the user clicks the "setting" button image, setting selection data is generated, and when the user clicks the "execute simulation" button image, simulation execution data is generated.

At least when the user executes the above-mentioned computer program for the first time with the client 100, as described above, because none of the mathematics expression data, the operand numerical data, or the basis data is recorded in the server recorder 223 of the server 200, the user is not able to cause the server 200 to execute the future prediction simulation by generating the simulation execution data. The user is required to first click the "setting" button to create a state in which the mathematics expression data, the operand numerical data, and the basis data are recorded in the server recorder 223 of the server 200. The setting selection data is generated when the user clicks the "setting" button.

The setting selection data follows a path similar to that of the start data, and is transmitted from the client 100 to the server 200.

At the server 200, similarly to the case of transmitting the start data from the client 100 to the server 200, the main control unit 222 in the server 200 transmits to the image generating unit 228 an instruction to generate image data for a setting image, which is an image corresponding to the fact that setting selection data has been input. The image generating unit 228 receives the instruction, and generates image data, which is the data of the setting image. The contents of the setting image are described later. The image data is transmitted from the image generating unit 228 to the output unit 229, and then transmitted from the output unit 229 to the transmission/reception mechanism. The image data is then transmitted to the client 100 from the transmission/reception mechanism via the network 400. The client 100 receives the image data at its transmission/reception mechanism.

In the client 100, the image data is transmitted to the main control unit 122 from the transmission/reception mechanism via the interface 114 and the input unit 121. When the image data is received, the main control unit 122 transmits the image data to the image generating unit 123. The image generating unit 123 generates image data for the setting image in the same manner as in the case of the image data for the top image. The image data is transmitted to the display 101 via the output unit 125 and the interface 114.

As a result of this processing, the setting image is displayed on the display 101 of the client 100 similarly to the case in which the image data for the top image is transmitted from the server 200 to the client 100. The setting image is an image for prompting the user to input the mathematics expression data, the operand numerical data, and the basis data, and is, for example, an image like that illustrated in FIG. 8. The user inputs the mathematics expression, the operand numerical value, and the basis, respectively, into the three columns arranged side by side of FIG. 8. Those inputs may be performed in any order. The inputs may also be performed by the user operating the input device 102. The relationship between the mathematics expression, the operand numerical value, and the basis described in the three columns arranged side by side is the same as the relationship among the three types of data recorded in the server recorder 223 of the server 200 described with reference to FIG. 6, or the same as the relationship among the mathematics expression, the operand numerical value, and the basis specified by those three types of data.

The data for specifying the mathematics expression input in the mathematics expression column is the mathematics expression data. Similarly, the data for specifying the operand numerical value input in the operand numerical value column is the operand numerical data, and the data for specifying the basis input in the basis column is the basis data. The basis data is text data.

Those data are transmitted to the input unit 121 from the input device 102 via the interface 114, then transmitted from the input unit 121 to the main control unit 122, and further transmitted from the main control unit 122 to the image generating unit 123. At this time, the main control unit 122 holds the latest mathematics expression data, operand numerical data, and basis data. The image generating unit 123 generates image data for displaying on the display 101 the mathematics expression, the operand numerical value, and the basis currently being input, and transmits the generated image data to the output unit 125. The output unit 125 transmits the image data to the display 101 via the interface 114. As a result, the mathematics expression, the operand numerical value, and the basis currently being input are displayed on the display 101 in substantially real time. The user inputs the mathematics expression, the operand numerical value, and the basis while confirming the mathematics expression, the operand numerical value, and the basis displayed on the display 101.

Figure 8:
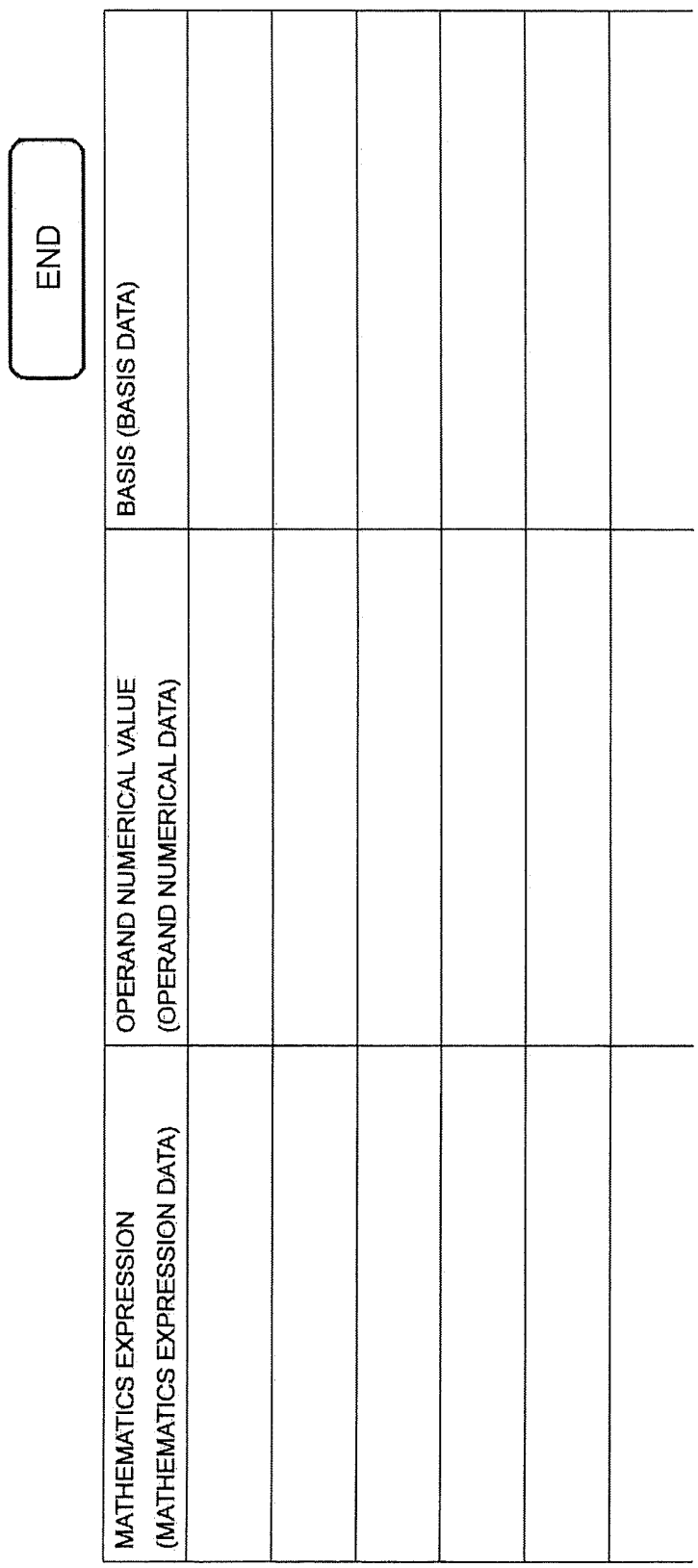
FIG. 8 is a diagram for illustrating another example of the image displayed on the display of the client illustrated in FIG. 1.

As illustrated in FIG. 8, for example, at the upper right of the setting image, there is displayed a button on which the word "end" is written. This button is used by the user to input, by clicking on the button, data indicating that the input of the mathematics expression data, the operand numerical data, and the basis data is complete. When the input of the three types of data is finished, the user operates the input device 102 and clicks on the "end" button.

Then, all the latest mathematics expression data, operand numerical data, and basis data that have been transmitted to the main control unit 122 are transmitted from the main control unit 122 to the output unit 125. The mathematics expression data, the operand numerical data, and the basis data are transmitted from the output unit 125 to the transmission/reception mechanism, and then transmitted to the server 200 via the network 400, in a state in which the server 200 can grasp that those data are linked to each other.

The server 200 receives the mathematics expression data, the operand numerical data, and the basis data at its transmission/reception mechanism. The mathematics expression data, the operand numerical data, and the basis data are transmitted to the input unit 221 from the transmission/reception mechanism via the interface, and then transmitted from the input unit 221 to the main control unit 222.

The main control unit 222 transmits the mathematics expression data, the operand numerical data, and the basis data to the server recorder 223, and records those data in the server recorder 223. Then, in the server recorder 223, the mathematics expression data, the operand numerical data, and the basis data are recorded in a state like that described with reference to FIG. 6.

In this embodiment, the mathematics expression data, the operand numerical data, and the basis data are collectively transmitted from the client 100 to the server 200, and in the server 200, those data are collectively recorded in the server recorder 223. However, this embodiment is not limited to this processing. For example, the mathematics expression data, the operand numerical data, and the basis data may be transmitted from the client 100 to the server 200 sequentially in the order in which those data were generated by the client 100. Alternatively, in the server 200, the information may be recorded in the server recorder 223 in the order in which those data were transmitted from the client 100.

In any case, when the mathematics expression data, the operand numerical data, and the basis data are recorded in the server recorder 223, the server 200 is in a state capable of executing the future prediction simulation.

Figure 7:
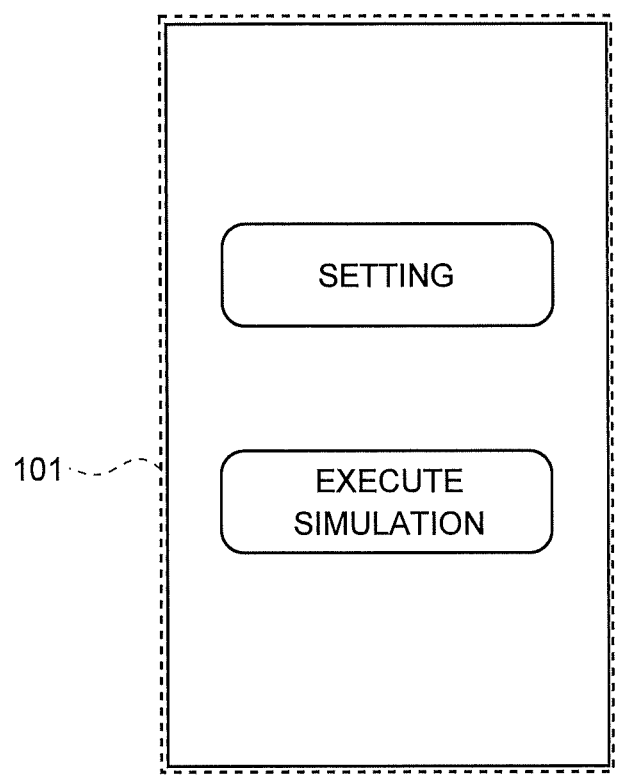
FIG. 7 is a diagram for illustrating an example of an image displayed on a display of the client illustrated in FIG. 1.

In a case where the user intends to execute the future prediction simulation, when the top image illustrated in FIG. 7 is displayed on the display 101, the user clicks on the "execute simulation" button. As a result, the simulation execution data is generated. The simulation execution data is transmitted from the client 100 to the server 200 in the same manner as the setting selection data.

the simulation execution data is transmitted to the main control unit 222 in the server 200 in the same manner as the setting selection data. When the main control unit 222 receives the simulation execution data, the main control unit 222 transmits an instruction to the simulating unit 224 to execute the future prediction simulation.

When the instruction is received, the simulating unit 224 executes the future prediction simulation. The future prediction simulation method may be a publicly-known or a well-known method. More specifically, in this embodiment, the simulating unit 224, which has received the instruction to execute the simulation, reads from the server recorder 223 all the mathematics expression data and the operand numerical data recorded in the server recorder 223 required to execute the future prediction simulation. However, this embodiment is not limited to this processing. Then, the simulating unit 224 performs an operation of substituting the operand numerical value specified by the operand numerical data into the mathematics expression specified by the mathematics expression data. As the result of the operation, the result of the future prediction simulation, that is, result data that is data for specifying the details of the prediction of the future, is generated.

The simulating unit 224 transmits the generated result data to the image generating unit 228. The image generating unit 228 receives the result data, and generates image data for the result image, which is an image that enables the user to grasp the result of the future prediction simulation. The image data is transmitted from the image generating unit 228 to the output unit 229, and is then transmitted from the output unit 229 to the transmission/reception mechanism. The image data is then transmitted to the client 100 from the transmission/reception mechanism via the network 400. The client 100 receives the image data at its transmission/reception mechanism.

Similarly to the case of the image data for the top image, in the client 100, the image data is transmitted to the main control unit 122 from the transmission/reception mechanism via the interface 114 and the input unit 121. When the image data is received, the main control unit 122 transmits the image data to the image generating unit 123. The image generating unit 123 generates image data for the result image, and transmits the generated image data to the output unit 125. The image data is also transmitted from the output unit 125 to the display 101 via the interface 114.

As a result, the result image is displayed in a browser displayed on the display 101 of the client 100. The user can grasp the result of the future prediction simulation by looking at the result image.

In this embodiment, the image data that is transmitted from the server 200 to the client 100 when the future prediction simulation is executed in the server 200 is image data for the result image. However, in place of the image data for the result image, the result data per se may be transmitted from the server 200 to the client 100. In this case, the image data for the result image may be generated by a predetermined part in the client 100, for example, the image generating unit 123, which has received the result data from the main control unit 122, based on the received result data.

The user can at anytime cause the server 200 to execute the future prediction simulation by transmitting the simulation execution data to the server 200 from the client 100, and can check the result image on the display 101 at any time. It is also possible to limit the number of times the user can cause the server 200 to execute the future prediction simulation, or to define that payment of money by the user to the administrator of the server 200 or the like is a condition of the future prediction simulation.

As long as there is no change in the mathematics expression data and the operand numerical data, the result of the future prediction simulation is always the same even when the future prediction simulation is executed a plurality of times. However, the user can at any time correct the mathematics expression data, the operand numerical data, and the basis data in the above-mentioned setting image, and as a result, the mathematics expression data, the operand numerical data, and the basis data recorded in the server recorder 223 of the server 200 can be corrected by, for example, overwriting each of those data. Therefore, the user can display a result image based on the latest mathematics expression data and operand numerical data on the display 101 of the client 100 at any time.

It is to be understood that correction of the mathematics expression data and the operand numerical data by the user at a time when he or she feels required to do so is useful to improve the accuracy of the future prediction simulation executed by the server 200. However, it is also possible for the accuracy of the result (result data) of past future prediction simulations based on past mathematics expression data and operand numerical data to be greatly deviating from reality.

The occurrence of such a situation is prevented by the server 200 of this embodiment as follows.

As described above, when the mathematics expression data, the operand numerical data, and the basis data are transmitted from the client 100 to the server 200, the main control unit 222 writes those data to the server recorder 223 in the server 200. When the main control unit 222 applies a change to the basis data in the server recorder 223 (including when the basis data is generated for the first time), the main control unit 222 notifies the interpreting unit 225 of that fact.

The interpreting unit 225 receives the data, reads all of the latest basis data recorded in the server recorder 223, and generates interpretation data. The interpretation data is data corresponding to the meaning of basis specified by the basis data. After the interpretation data is generated, the interpreting unit 225 transmits the generated interpretation data to the related information collecting unit 226. In this embodiment, the interpreting unit 225 transmits the interpretation data to the related information collecting unit 226 together with the underlying basis data. However, this embodiment is not limited to this processing.

The related information collecting unit 226 receives the interpretation data and the basis data from the interpreting unit 225. The related information collecting unit 226, which has received those data, collects related information from the search target. The related information is information related to the basis specified by the basis data. The related information collecting unit 226 uses the interpretation data received from the interpreting unit 225 to collect related information as information related to the meaning of the basis specified by the interpretation data. In this embodiment, the related information collecting unit 226 collects related information by crawling the Internet.

When the related information collecting unit 226 finds related information, the related information collecting unit 226 transmits the found related information to the determining unit 227. In this embodiment, when the related information collecting unit 226 transmits related information to the determining unit 227, the related information is transmitted to the determining unit 227 in a state in which the related information is linked to the basis data regarding the basis relating to that related information or to interpretation data generated based thereon. However, the present embodiment is not limited to this processing.

The timing of transmitting the related information found by the related information collecting unit 226 to the determining unit 227 can be appropriately determined. For example, each time the related information collecting unit 226 finds related information, that related information may be immediately transmitted to the determining unit 227. The related information collecting unit 226 may also store found related information, and transmit the information to the determining unit 227 at predetermined time intervals. For example, when the determining unit 227 is configured to perform the determination processing at predetermined time intervals, the related information collecting unit 226 may transmit the related information to the determining unit 227 some time before the determination processing is executed. When the determining unit 227 is configured to perform the determination processing at predetermined time intervals, for example, the determining unit 227 may also prompt the related information collecting unit 226 to provide the related information, which is currently held by the related information collecting unit 226, to the determining unit 227, and in response to that, the related information collecting unit 226 may transmit the related information to the determining unit 227.

The determining unit 227 receives the related information collected by the related information collecting unit 226, and uses the received related information to determine whether or not the basis data is required to be corrected.

When the determining unit 227 in this embodiment receives the related information from the related information collecting unit 226, the determining unit 227 determines that the basis data specifying the basis relating to that related information is required to be corrected. However, this embodiment in not limited to this processing. Specifically, the determining unit 227 of this embodiment determines, based on the existence of the related information, that the basis data is required to be corrected. However, the determining unit 227 may also be configured to again perform a determination of whether or not the related information received from the related information collecting unit 226 has an influence sufficient to require correction of the basis data, and based on that determination result, to determine whether or not the basis data is required to be corrected.

The determining unit 227 generates, when it is determined that the basis data is required to be corrected, alert data, which is data for prompting the user of the client 100 to correct the mathematics expression data or the operand numerical data for specifying at least a part of the basis data, or a mathematics expression or operand numerical value generated based on the basis specified by that basis data. After the alert data is generated, the determining unit 227 transmits the alert data to the image generating unit 228.

The timing at which the determining unit 227 performs determination processing like that described above may be set to predetermined time intervals. Those time intervals may be determined by the user, for example. The determining unit 227 may also be configured to constantly perform determinations like those described above. In that case, the related information collecting unit 226 is required to immediately transmit related information to the determining unit 227 each time related information is found.

The image generating unit 228 receives the alert data from the determining unit 227. The image generating unit 228, which has received the alert data, generates, based on the alert data, image data for displaying the alert image on the display 101 of the client 100. The alert image data is an image data that enables the user to grasp, based on the alert image specified by the alert image data, where a correction is required in the basis specified by the basis data, or where a correction is required in the mathematics expression or the operand numerical value generated based on the basis specified by the basis data.

In any case, the image data for the alert image generated by the image generating unit 228 is transmitted to the output unit 229.

The image data for the alert image is transmitted from the output unit 229 to the transmission/reception mechanism, and then transmitted to the client 100 from the transmission/reception mechanism via the network 400.

The client 100 receives the image data for the alert image in its transmission/reception mechanism. The image data is transmitted to the input unit 121 from the transmission/reception mechanism via the interface 114, then transmitted from the input unit 121 to the main control unit 122, and further transmitted from the main control unit 122 to the image generating unit 123.

The image generating unit 123 generates image data for the alert image, and transmits the generated image data to the display 101 via the output unit 125 and the interface 114. The alert image is displayed on the display 101. The time taken for the alert image to be displayed on the display 101 after the alert data is generated by the determining unit 227 of the server 200 is, for example, several seconds, which is extremely short, and immediately after the alert data is generated by the determining unit 227, an alert image is displayed on the display 101 of the client 100. In this case, when the above-mentioned computer program is constantly executed on the client 100, for example, in the background, the alert image can be displayed on the display 101 based on the transmitted image data.

The user can understand that a correction is required in the basis specified by the basis data, or in the mathematics expression or the operand numerical value generated based on the basis specified by the basis data, by looking at the alert image. In most cases, when a correction is required for the basis, a correction is also required for the mathematics expression and the operand numerical value. When the user sees the alert image, the user can correct the basis (basis data) as required based on his or her own judgment, or can correct the mathematics expression (mathematics expression data) and the operand numerical value (operand numerical data) as required.

The alert image in this embodiment is an image that enables the user to grasp where in the basis specified by the basis data a correction is required. However, this embodiment is not limited to this processing. For example, as shown in the fourth row from the top of FIG. 6, in response to the basis that "a weaker yen is advantageous when exporting product a sold by our company, but the exchange rate for the next half year is expected to be 100 yen±5 yen to the dollar", when the reality is "the current exchange rate is 80 yen to the dollar", an emphasized display can be added to the portion "100 yen±5 yen to the dollar" of the basis by adding underlining or displaying in bold letters. It is also possible to further display at the emphasized portion a reason why a correction is required in the basis, such as "the current exchange rate is 80 yen to the dollar."

In this embodiment, as described above, when the alert data is generated in the determining unit 227 of the server 200, the image data for the alert image generated by the image generating unit 228 of the server 200 is transmitted from the server 200 to the client 100.

However, because the role of the alert image is to inform the user that the basis specified by the basis data is required to be corrected, the image data is not always required to be transmitted to the client 100 when the alert data is generated at the server 200. For example, in place of the image data described above, text data informing that the basis specified by the basis data, or the mathematics expression or the operand numerical value generated based on the basis specified by the basis data, is required to be corrected may be transmitted from the server 200 to the client 100. The data may be transmitted from the server 200 to the client 100 using an e-mail function or an SNS messaging function, such as Facebook (trademark) or twitter (trademark) of the client 100. In that case, for example, an alert image like that described above may be displayed on the display 101 only when the setting image is displayed on the display 101 as a result of performing a procedure such as that described above by a user informed through reception of such data from the client 100 that the basis specified by the basis data, or the mathematics expression or the operand numerical value generated based on the basis specified by the basis data, is required to be corrected.

The subsequent processing at a time when the user changes at least one of the basis data, the mathematics expression data, or the operand numerical data is as follows.

When the mathematics expression data or the operand numerical data is changed, the result obtained by the future prediction simulation executed by the simulating unit 224 may be different from the previous result.

When the basis data is changed, the interpretation data subsequently generated by the interpreting unit 225 may be different from the previous interpretation data, and the related information collected by the related information collecting unit 226 may be different from the related information collected before that.

MODIFICATION EXAMPLE

There is now described a future prediction simulation apparatus according to a modification example of the present embodiments.

The future prediction simulation apparatus according to the embodiment described above is built as the server 200, which is so-called a cloud server.

Meanwhile, the future prediction simulation apparatus according to the modification example is a so-called on-premise type. In the modification example, there is no server 200 that existed in the embodiment, and the client 100 in the embodiment functions as the future prediction simulation apparatus by itself. Broadly speaking, it can be said that the client 100 in the modification example is a component integrating the client 100 and the server 200 described in the above-mentioned embodiment.

In the description of the modification example, descriptions overlapping with those of the above-mentioned embodiment may be omitted.

In terms of its hardware configuration, the client 100 serving as the future prediction simulation apparatus according to the modification example is the same as that of the embodiment described above, including the display 101 and the input device 102. However, unlike the case of the above-mentioned embodiment, the client 100 of the modification example is not required to communicate to and from the server 200, and hence is not required to include the transmission/reception mechanism.

Figure 9:
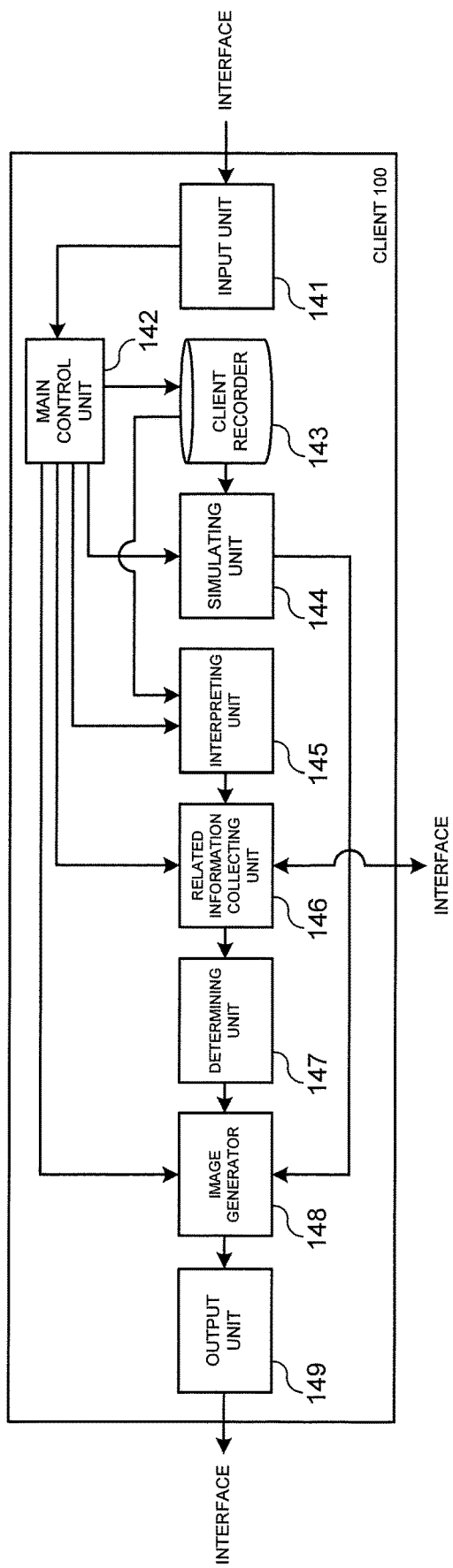
FIG. 9 is a block diagram for illustrating function blocks generated in the client in a modification example of the present embodiments.

When the CPU 111 of the client 100 executes the computer program, function blocks like those illustrated in FIG. 9 are generated in the client 100. The following function blocks may be generated by the functions of the above-mentioned computer program alone for causing the client 100 to execute processing such as that described later, or may also be generated by the above-mentioned computer program and an OS or another computer program installed in the client 100 working together in cooperation.

In the client 100, in terms of a relation with the functions of the embodiments of the present application, an input unit 141, a main control unit 142, a client recorder 143, a simulating unit 144, an interpreting unit 145, a related information collecting unit 146, a determining unit 147, an image generating unit 148, and an output unit 149 are generated (FIG. 9).

The input unit 141 receives inputs from the interface 114 in the same manner as the input unit 121 in the client 100 of the embodiment described above.

The inputs to the input unit 141 from the interface 114 may include an input from the input device 102. The Input from the input device 102 may be the same inputs as in the case described above. However, the input is not limited thereto. In the modification example as well, examples of the input from the input device 102 include start data, setting selection data, mathematics expression data, operand numerical data, and basis data. When those inputs have been input from the input device 102, all of the data from those inputs is transmitted from the input unit 141 to the main control unit 142.

Similarly to the main control unit 122 in the client 100 of the above-mentioned embodiment, the main control unit 142 performs overall control of each of the function blocks generated in the client 100.

The main control unit 142 may receive the start data, the setting selection data, and the simulation execution data from the input unit 141. When the start data and the setting selection data are received, the main control unit 142 transmits to the image generating unit 148 an instruction to generate image data for an image corresponding to those received data. This instruction is similar to the instruction issued by the main control unit 222 in the server 200 of the above-described embodiment. When the simulation execution data is received, the main control unit 142 transmits to the simulating unit 144 an instruction to execute the future prediction simulation. This is a function that is not present in the main control unit 122 in the client 100 of the embodiment described above.

The main control unit 142 may receive the mathematics expression data, the operand numerical data, and the basis data from the input unit 141. When those data are received, the main control unit 142 transmits each of those data to the image generating unit 148 and the client recorder 143. The mathematics expression data, the operand numerical data, and the basis data transmitted to the client recorder 143 are recorded in the client recorder 143. This operation corresponds to the main control unit 222 recording the mathematics expression data, the operand numerical data, and the basis data in the server recorder 223 in the server 200 of the embodiment described above.

The client recorder 143 corresponds to the server recorder 223 in the server 200 of the embodiment described above. As described above, the client recorder 143 receives the mathematics expression data, the operand numerical data, and the basis data from the main control unit 142. The client recorder 143 records the mathematics expression data, the operand numerical data, and the basis data received from the main control unit 142.

There is no difference between: the mathematics expression and mathematics expression data, the operand numerical value and operand numerical data, the basis and basis data, which are recorded in the client recorder 143; and those recorded in the server recorder 223 in the embodiment described above in addition to how the mathematics expression data, the operand numerical data, and the basis data are linked to one another.

The simulating unit 144 corresponds to the simulating unit 224 in the server 200 of the embodiment described above. The simulating unit 144 has a function of executing a future prediction simulation. The future prediction simulation executed by the simulating unit 144 may be the same as that executed by the simulating unit 224 in the server 200 of the embodiment described above.

The simulating unit 144 may receive an instruction from the main control unit 142 to execute the future prediction simulation as described above. When such an instruction is received, the simulating unit 144 executes the future prediction simulation. When executing the future prediction simulation, the simulating unit 144 reads the mathematics expression data and the operand numerical data from the client recorder 143, and executes future prediction simulation by using the mathematics expression and operand numerical value specified thereby. This is the same as in the above-mentioned embodiment.

In the modification example as well, the simulating unit 144 generates result data by performing a future prediction simulation. The result data is transmitted from the simulating unit 144 to the image generating unit 148.

The interpreting unit 145 corresponds to the interpreting unit 225 in the server 200 of the above-mentioned embodiment. The interpreting unit 145 has a function of generating the interpretation data.

The interpretation data in the modification example may be the same as the interpretation data in the above-mentioned embodiment, and the method of generating the interpretation data by the interpreting unit 145 may also be the same as the method used to generate the interpretation data by the interpreting unit 225 in the server 200 of the embodiment described above.

When there is a change in basis data recorded in the client recording unit 143, the interpreting unit 145 is notified of that fact from the main control unit 142. The interpreting unit 145 receives the notification, reads all of the basis data recorded in the client recorder 143, and generates interpretation data for each basis specified by each basis data. The interpreting unit 145 may automatically generate interpretation data at predetermined time intervals, for example, in which case the notification from the main control unit 142 to the interpreting unit 145 is not required.

After the interpretation data is generated, the interpreting unit 145 transmits the generated interpretation data to the related information collecting unit 146. In this modification example, the interpreting unit 145 transmits the interpretation data as well as the basis data from which the interpreting unit 145 originates to the related information collecting unit 146. However, the interpreting unit 145 is not limited to such a configuration.

The related information collecting unit 146 is equivalent to the related information collecting unit 226 in the server 200 of the above-mentioned embodiment. The related information collecting unit 146 has a function of collecting related information, which is information related to the basis specified by the basis data from a predetermined search target.

The related information collecting unit 146 in this modification example collects, by using the interpretation data received from the interpreting unit 145, related information as information related to the meaning of the basis specified by the interpretation data.

The related information in the modification example may be the same as the related information in the embodiment described above. The method and scope of collecting related information by the related information collecting unit 146 in the modification example may also be the same as the method and scope of collecting related information by the related information collecting unit 226 in the server 200 of the above-mentioned embodiment. In the modification example, the related information collecting unit 146 collects related information by crawling the Internet. However, the present embodiment is not limited to this processing.

When the related information collecting unit 146 finds related information, the related information collecting unit 146 transmits the found related information to the determining unit 147. When the related information collecting unit 146 transmits related information to the determining unit 147, the related information is transmitted to the determining unit 147 in a state in which the related information is linked to the basis data regarding the basis relating to that related information or to interpretation data generated based thereon. However, this modification example is not limited to this processing.

The determining unit 147 is equivalent to the determining unit 227 in the server 200 of the above-mentioned embodiment. The determining unit 147 has a function of determining, in terms of the relation with the above-mentioned related information collected by the related information collecting unit 146, whether or not the basis data is required to be corrected.

The determination method executed by the determining unit 147 maybe the same as the determination method executed by the determining unit 227 in the server 200 of the above-mentioned embodiment. As described above, the determining unit 147 may receive from the related information collecting unit 146 the related information and the basis data. The determining unit 147 in this modification example determines, when the related information is received from the related information collecting unit 146, that the basis data specifying the basis related to the related information is required to be corrected. However, this modification example is not limited to this processing.

The determining unit 147 generates, when it is determined that the basis data is required to be corrected, alert data, which is data for prompting the user of the client 100 to correct at least a part of the basis data, or the mathematics expression data or the operand numerical data. Herein, the mathematics expression data is data for specifying the mathematics expression and generated based on the basis specified by the basis data and the operand numerical data is data for specifying the operand numerical value and generated based on the basis specified by that basis data. After the alert data is generated, the determining unit 147 transmits the alert data to the image generating unit 148. This is also the same as in the above-mentioned embodiment.

The image generating unit 148 in the modification example has a function of combining the image generating unit 123 in the client 100 of the above-mentioned embodiment and the image generating unit 228 in the server 200 of the above-mentioned embodiment. The image generating unit 148 has a function of generating image data, which is data regarding an image to be displayed on the display 101.

Other image data is also generated by the image generating unit 148, but representative examples of the image data generated by the image generating unit 148 are the image data regarding the result image and the alert image. The result image and the alert image may be the same as those in the embodiment described above.

As described above, the image generating unit 148 may receive result data from the simulating unit 144. When the result data is received, the image generating unit 148 generates image data for the result image.

As described above, the image generating unit 148 may receive alert data from the determining unit 147. When the alert data is received, the image generating unit 148 generates image data for the alert image. The image data is data that enables the user to grasp, based on the alert image specified by that image data, where a correction is required in the basis data, or where a correction is required in the mathematics expression or the operand numerical value generated based on the basis specified by the basis data.

In any case, the image data generated by the image generating unit 148 is transmitted to the output unit 149.

The output unit 149 outputs the data generated by the function blocks in the client 100 to the interface 114.

As described above, image data may be transmitted from the image generating unit 148 to the output unit 149. When image data is received, the output unit 149 transmits the image data to the display 101 via the interface 114. The display 101, which has received the image data, displays an image corresponding to the image data.

Next, use and operation of the client 100 as a future prediction simulation apparatus described above are described.

First of all, the user intending to execute the future prediction simulation by the client 100 serving as the future prediction simulation apparatus generates the mathematics expression data, the operand numerical data, and the basis data in the same manner as in the above-mentioned embodiment. Initially, none of the mathematics expression data, the operand numerical data, or the basis data is recorded in the client recorder 143.

Specifically, first of all, the user operates the input device 102 of the client 100 and inputs start data. When the start data has been input, the start data is transmitted from the interface 114 to the input unit 141, and then transmitted from the input unit 141 to the main control unit 142. When the start data is received, the main control unit 142 transmits to the image generating unit 148 an instruction to generate a top image, which is an image corresponding to the fact that start data has been input. The image generating unit 148 receives the instruction, and generates image data, which is the data of the top image. The image data is transmitted from the image generating unit 148 to the output unit 149, and then transmitted to the display 101 from the output unit 149 via the interface 114.

As a result, a top image is displayed on the display 101. The top image of the modification example is the same as that in the embodiment described above, and is as illustrated in FIG. 7. The user inputs setting selection data by clicking the image of the "setting" button, or inputs simulation selection data by clicking the image of the "simulation execution" button.

At least when the user executes the above-mentioned computer program for the first time with the client 100, the user is required to input setting selection data.

The setting selection data follows a similar path to that of the start data, and is transmitted from the input device 102 to the main control unit 142.

When the main control unit 142 receives the setting selection data, the main control unit 142 transmits to the image generating unit 148 an instruction to generate image data for a setting image, which is an image that is displayed when the setting selection data has been input. The image generating unit 148 receives the instruction, and generates image data, which is data of the setting image. The image data is transmitted from the image generating unit 148 to the output unit 149, and then transmitted to the display 101 from the output unit 149 via the interface 114.

As a result, the setting image is displayed on the display 101 of the client 100. The setting image in the modification example may be the same as that in the above-mentioned embodiment, and is, for example, as illustrated in FIG. 8. The user inputs the mathematics expression, the operand numerical value, and the basis, respectively, in the three columns arranged side by side of FIG. 8 in the same manner as in the above-mentioned embodiment.

The mathematics expression data, the operand numerical data, and the basis data are transmitted to the input unit 141 from the input device 102 via the interface 114, and then transmitted to the image generating unit 148 from the input unit 141 via the main control unit 142. The latest mathematics expression data, operand numerical data, and basis data are temporarily held by the main control unit 142. The image generating unit 148 generates image data for displaying on the display 101 the mathematics expression, operand numerical value, and basis that are currently being input, and transmits the generated image data to the output unit 149. The output unit 149 transmits the image data to the display 101 via the interface 114. As a result, the mathematics expression, the operand numerical value, and the basis that are currently being input are displayed on the display 101 in substantially real time. This is exactly the same as the embodiment described above. The user inputs the mathematics expression, the operand numerical value, and the basis while confirming the mathematics expression, the operand numerical value, and the basis displayed on the display 101.

Similarly to the case of the above-mentioned embodiment, data indicating that input of all of the mathematics expression data, the operand numerical data, and the basis data is finished is input by the user clicking on the "end" button in the selection image.

As a result, the latest data for all of the mathematics expression data, the operand numerical data, and the basis data transmitted to the main control unit 142 is transmitted from the main control unit 142 to the client recorder 143 and recorded in the client recorder 143. Then, in the client recorder 143, the mathematics expression data, the operand numerical data, and the basis data are recorded in the same state as recorded in the server recorder 223 of the server 200 of the above-mentioned embodiment.

The timing of the recording of the mathematics expression data, the operand numerical data, and the basis data in the client recorder 143 may be changed similarly to the case of the above-mentioned embodiment.

In any case, when the mathematics expression data, the operand numerical data, and the basis data are recorded in the client recorder 143, the client 100 is in a state capable of executing the future prediction simulation.

In a case where the user intends to execute the future prediction simulation, when the top image is displayed on the display 101, the user clicks on the "execute simulation" button. As a result, the simulation execution data is generated. The simulation execution data is transmitted from the input device 102 to the main control unit 142 in the same manner as the setting selection data.

When the main control unit 142 receives the simulation execution data, the main control unit 142 transmits an instruction to the simulating unit 144 to execute the future prediction simulation.

When the instruction is received, the simulating unit 144 executes the future prediction simulation in the same manner as in the above-mentioned embodiment. The future prediction simulation method may be the same method as that of the above-mentioned embodiment. The simulating unit 144, which has received the instruction to execute the simulation, reads from the client recorder 143 the mathematics expression data and the operand numerical data required to execute the future prediction simulation. Then, the simulating unit 144 performs an operation of substituting the operand numerical value specified by the operand numerical data into the mathematics expression specified by the mathematics expression data. As the result of the operation, the result of the future prediction simulation, that is, result data that is data for specifying the details of the prediction of the future, is generated.

The simulating unit 144 transmits the generated result data to the image generating unit 148. The image generating unit 148 receives the result data, and generates image data for the result image, which is an image that enables the user to grasp the result of the future prediction simulation. The image data is transmitted from the image generating unit 148 to the output unit 149, and is then transmitted from the output unit 149 to the display 101 via the interface 114.

As a result, the result image is displayed on the display 101 of the client 100. The user can grasp the result of the future prediction simulation by looking at the result image.

The user can cause the client 100 to execute the future prediction simulation at any time by inputting the simulation execution data, and can check the result image on the display 101 at any time. However, as described in the above-mentioned embodiment, a restriction can be placed on this operation.

The user can correct the mathematics expression data and the operand numerical data when the user feels that it is required to do so, as in the above-mentioned embodiment.

Meanwhile, in the modification example, when the main control unit 142 changes the basis data in the client recorder 143, the main control unit 142 notifies the interpreting unit 145 of that fact. The interpreting unit 145 receives the data, reads all of the latest basis data recorded in the client recorder 143, and generates interpretation data. After the interpretation data is generated, the interpreting unit 145 transmits the generated interpretation data to the related information collecting unit 146. Also in this modification example, similarly to the case of the above-mentioned embodiment, the interpreting unit 145 transmits the interpretation data to the related information collecting unit 146 together with the underlying basis data. However, this modification example is not limited to this processing.

The related information collecting unit 146 receives the interpretation data and the basis data from the interpreting unit 145. The related information collecting unit 146, which has received those data, collects related information from the search target, as in the above-mentioned embodiment.

When the related information collecting unit 146 finds related information, the related information collecting unit 146 transmits the found related information to the determining unit 147. In this embodiment, when the related information collecting unit 146 transmits related information to the determining unit 147, the related information is transmitted to the determining unit 147 in a state in which the related information is linked to the basis data regarding the basis relating to that related information or to interpretation data generated based thereon. However, the present embodiment is not limited to this processing.

The timing of transmitting the related information found by the related information collecting unit 146 to the determining unit 147 may be the same as that of the above-mentioned embodiment, and can be appropriately determined in the same manner as in the above-mentioned embodiment.

The determining unit 147 receives the related information collected by the related information collecting unit 146, and uses the received related information to determine whether or not the basis data is required to be corrected. This processing is the same as the determination processing performed by the determining unit 227 of the above-mentioned embodiment.

When it is determined that the basis data is required to be corrected, the determining unit 147 generates the same alert data as that in the above-mentioned embodiment. After the alert data is generated, the determining unit 147 transmits the generated alert data to the image generating unit 148.

The timing at which the determining unit 147 performs the above-mentioned determination processing may be determined in the same manner as the timing at which the determining unit 227 in the server 200 of the above-mentioned embodiment performs the determination processing.

The image generating unit 148 receives the alert data from the determining unit 147. The image generating unit 148, which has received the alert data, generates, based on the alert data, image data for displaying the alert image on the display 101 of the client 100. The alert image data in the modification example may be the same as that of the above-mentioned embodiment.

In any case, the image data for the alert image generated by the image generating unit 148 is transmitted to the output unit 149, and then also transmitted to the display 101 via the interface 114. The alert image is displayed on the display 101. The time taken for the alert image to be displayed on the display 101 after the alert data is generated by the determining unit 147 is extremely short, for example, several seconds, as in the case of the above-mentioned embodiment.

The user can understand that a correction is required in the basis specified by the basis data, or in the mathematics expression or the operand numerical value generated based on the basis specified by the basis data, by looking at the alert image. It is clear that, when a correction is required for the basis, a correction is also required for the mathematics expression and the operand numerical value in almost case. When the user sees the alert image, the user can correct the basis (basis data) as required based on his or her own judgment, or can correct the mathematics expression (mathematics expression data) and the operand numerical value (operand numerical data) as required.

Similarly to the case of the above-mentioned embodiment, the user can use a method other than the alert image, for example, an email, to understand that the basis specified by the basis data, or the mathematics expression or operand numerical value generated based on the basis specified by that basis data, is required to be corrected.

The subsequent processing when at a time the user changes at least one of the basis data, the mathematics expression data, or the operand numerical data is the same as that of the above-mentioned embodiment.

REFERENCE SIGNS LIST

100 client
101 display
102 input device
121 input unit
122 main control unit
123 image generating unit
125 output unit
141 input unit
142 main control unit
143 client recorder
144 simulating unit
145 interpreting unit
146 related information collecting unit
147 determining unit
148 image generating unit
149 output unit
221 input unit
222 main control unit
223 server recorder
224 simulating unit
225 interpreting unit
226 related information collecting unit
227 determining unit
228 image generating unit
229 output unit

The invention claimed is:

1. A future prediction simulation apparatus, comprising:
a first recorder configured to record at least one piece of mathematics expression data, which is data for specifying a mathematics expression required in order to execute a simulation for predicting a future, and at least one piece of operand numerical data, which is data for specifying an operand numerical value, which is a numerical value to be used in an operation when the operation is performed in accordance with the mathematics expression, both of the at least one piece of mathematics expression data and the at least one piece of operand numerical data being generated by a user;
a calculator configured to execute a simulation for predicting the future to generate prediction data, which is data relating to a prediction of the future, by using the operand numerical value specified by the at least one piece of operand numerical data recorded in the first recorder to perform an operation based on the mathematics expression specified by the at least one piece of mathematics expression data recorded in the first recorder;
a second recorder configured to record basis data, which is text data generated by the user, for specifying a basis used by the user to determine the mathematics expression specified by the at least one piece of mathematics expression data recorded in the first recorder and the operand numerical value specified by the at least one piece of operand numerical data recorded in the first recorder;
a related information collector configured to collect related information, which is information related to the basis specified by the basis data, from a predetermined search target;
a determiner configured to determine whether the basis data is required to be corrected in terms of a relation with the related information collected by the related information collector;
an alerter configured to generate, when it is determined by the determiner that the basis data is required to be corrected, alert data, which is data for prompting the user to correct at least one of: the at least one piece of mathematics expression data; the at least one piece of operand numerical data; and the basis data; and
an image generator configured to generate, based on the alert data generated by the alerter, image data for an alert image, which is an image for visually informing the user of a requirement to correct at least one of: the at least one piece of mathematics expression data; the at least one piece of operand numerical data; or the basis data,
wherein the future prediction simulation apparatus is connected to a predetermined display having a function of displaying an image, and
wherein the future prediction simulation apparatus is configured to inform the user of the requirement to correct at least one of: the at least one piece of mathematics expression data; the at least one piece of operand numerical data; or the basis data, by displaying on the predetermined display, in real time based on a constantly executing computer program, the alert image based on the image data generated by the image generator.

2. The future prediction simulation apparatus according to claim 1, further comprising an interpreter configured to interpret, based on the basis data, a meaning of the basis specified by the basis data to generate interpretation data, which is data corresponding to the meaning of the basis,
wherein the related information collector is configured to collect the related information based on the interpretation data generated by the interpreter.

3. The future prediction simulation apparatus according to claim 1, wherein the related information collector is configured to collect the related information from among pieces of information recorded in advance in a recording device.

4. The future prediction simulation apparatus according to claim 1, wherein the related information collector is configured to collect the related information from among pieces of information existing on the Internet.

5. The future prediction simulation apparatus according to claim 1, wherein the determiner is configured to automatically determine at a predetermined timing whether the basis data is required to be corrected.

6. The future prediction simulation apparatus according to claim 1, wherein the alerter is configured to immediately generate the alert data when it is determined by the determiner that the basis data is required to be corrected.

7. The future prediction simulation apparatus according to claim 1, wherein the alert image includes an emphasized portion visually emphasizing why a correction is required in the basis data.

8. A future prediction simulation apparatus, comprising:
a first recorder configured to record at least one piece of mathematics expression data, which is data for specifying a mathematics expression required in order to execute a simulation for predicting a future, and at least one piece of operand numerical data, which is data for specifying an operand numerical value, which is a numerical value to be used in an operation when the operation is performed in accordance with the mathematics expression, both of the at least one piece of mathematics expression data and the at least one piece of operand numerical data being generated by a user;
a calculator configured to execute a simulation for predicting the future to generate prediction data, which is data relating to a prediction of the future, by using the operand numerical value specified by the at least one piece of operand numerical data recorded in the first recorder to perform an operation based on the mathematics expression specified by the at least one piece of mathematics expression data recorded in the first recorder;
a second recorder configured to record basis data, which is text data generated by the user, for specifying a basis used by the user to determine the mathematics expression specified by the at least one piece of mathematics expression data recorded in the first recorder and the operand numerical value specified by the at least one piece of operand numerical data recorded in the first recorder;
a related information collector configured to collect related information, which is information related to the basis specified by the basis data, from a predetermined search target;
a determiner configured to determine whether the basis data is required to be corrected in terms of a relation with the related information collected by the related information collector;
an alerter configured to generate, when it is determined by the determiner that the basis data is required to be corrected, alert data, which is data for prompting the user to correct at least one of: the at least one piece of mathematics expression data; the at least one piece of operand numerical data; and the basis data; and
communication means for communicating via a predetermined network to and from a predetermined computer to be operated by the user and connected to a predetermined display having a function of displaying an image,
wherein the communication means is configured to:
transmit the alert data generated by the alerter to the predetermined computer to be operated by the user; and
inform the user that the basis data is required to be corrected by displaying on the predetermined display of the predetermined computer an alert image in real time based on a constantly executing computer program, wherein the alert image is an image for visually informing, based on the alert data, the user of a requirement to correct at least one of: the at least one piece of mathematics expression data; the at least one piece of operand numerical data; or the basis data.

9. The future prediction simulation apparatus according to claim 1, wherein the alert image is visually informing the user that the basis data is required to be corrected in the state of specifying which portion of the basis data is required to be corrected.

10. A method to be executed by a future prediction simulation apparatus, the future prediction simulation apparatus including:
a first recorder configured to record at least one piece of mathematics expression data, which is data for specifying a mathematics expression required in order to execute a simulation for predicting a future, and at least one piece of operand numerical data, which is data for specifying an operand numerical value, which is a numerical value to be used in an operation when the operation is performed in accordance with the mathematics expression, both of the at least one piece of mathematics expression data and the at least one piece of operand numerical data being generated by a user; and
a calculator configured to execute a simulation for predicting the future to generate prediction data, which is data relating to a prediction of the future, by using the operand numerical value specified by the at least one piece of operand numerical data recorded in the first recorder to perform an operation based on the mathematics expression specified by the at least one piece of mathematics expression data recorded in the first recorder,
wherein the future prediction simulation apparatus is connected to a predetermined display having a function of displaying an image,
the method comprising:
a step of recording, into a second recorder, basis data, which is text data generated by the user, for specifying a basis used by the user to determine the mathematics expression specified by the at least one piece of mathematics expression data recorded in the first recorder and the operand numerical value specified by the at least one piece of operand numerical data recorded in the first recorder;
a related information collection step of collecting related information, which is information related to the basis specified by the basis data, from a predetermined search target;
a determination step of determining whether the basis data is required to be corrected in terms of a relation with the related information collected in the related information collection step;
an alert step of generating, when it is determined in the determination step that the basis data is required to be corrected, alert data, which is data for prompting the user to correct at least one of: the at least one piece of mathematics expression data; the at least one piece of operand numerical data; and the basis data;
an image generator step of generating, based on the alert data generated in the alert step, image data for an alert image, which is an image for visually informing the user of a requirement to correct at least one of: the at least one piece of mathematics expression data; the at least one piece of operand numerical data; or the basis data; and an informing step of informing the user of the requirement to correct at least one of: the at least one piece of mathematics expression data; the at least one piece of operand numerical data; or the basis data, by displaying on the predetermined display, in real time based on a constantly executing computer program, the alert image based on the image data generated in the image generator step.

11. A non-transitory computer-readable medium storing instructions executable by a processor, which upon such execution, cause the processor to function as a future prediction simulation apparatus, the processor being caused to function as:

a first recorder configured to record at least one piece of mathematics expression data, which is data for specifying a mathematics expression required in order to execute a simulation for predicting a future, and at least one piece of operand numerical data, which is data for specifying an operand numerical value, which is a numerical value to be used in an operation when the operation is performed in accordance with the mathematics expression, both of the at least one piece of mathematics expression data and the at least one piece of operand numerical data being generated by a user;

a calculator configured to execute a simulation for predicting the future to generate prediction data, which is data relating to a prediction of the future, by using the operand numerical value specified by the at least one piece of operand numerical data recorded in the first recorder to perform an operation based on the mathematics expression specified by the at least one piece of mathematics expression data recorded in the first recorder;

a second recorder configured to record basis data, which is text data generated by the user, for specifying a basis used by the user to determine the mathematics expression specified by the at least one piece of mathematics expression data recorded in the first recorder and the operand numerical value specified by the at least one piece of operand numerical data recorded in the first recorder;

a related information collector configured to collect related information, which is information related to the basis specified by the basis data, from a predetermined search target;

a determiner configured to determine whether the basis data is required to be corrected in terms of a relation with the related information collected by the related information collector;

an alerter configured to generate, when it is determined by the determiner that the basis data is required to be corrected, alert data, which is data for prompting the user to correct at least one of: the at least one piece of mathematics expression data; the at least one piece of operand numerical data; and the basis data; and an image generator configured to generate, based on the alert data generated by the alerter, image data for an alert image, which is an image for visually informing the user of a requirement to correct at least one of: the at least one piece of mathematics expression data; the at least one piece of operand numerical data; or the basis data, wherein the future prediction simulation apparatus is connected to a predetermined display having a function of displaying an image, and wherein the future prediction simulation apparatus is configured to inform the user of the requirement to correct at least one of: the at least one piece of mathematics expression data; the at least one piece of operand numerical data; or the basis data, by displaying on the predetermined display, in real time based on a constantly executing computer program, the alert image based on the image data generated by the image generator.

12. The future prediction simulation apparatus according to claim 8, wherein the alert image is visually informing the user that the basis data is required to be corrected in the state of specifying which portion of the basis data is required to be corrected.

13. A method to be executed by a future prediction simulation apparatus, the future prediction simulation apparatus including:

a first recorder configured to record at least one piece of mathematics expression data, which is data for specifying a mathematics expression required in order to execute a simulation for predicting a future, and at least one piece of operand numerical data, which is data for specifying an operand numerical value, which is a numerical value to be used in an operation when the operation is performed in accordance with the mathematics expression, both of the at least one piece of mathematics expression data and the at least one piece of operand numerical data being generated by a user;

a calculator configured to execute a simulation for predicting the future to generate prediction data, which is data relating to a prediction of the future, by using the operand numerical value specified by the at least one piece of operand numerical data recorded in the first recorder to perform an operation based on the mathematics expression specified by the at least one piece of mathematics expression data recorded in the first recorder; and communication means for communicating via a predetermined network to and from a predetermined computer to be operated by the user and connected to a predetermined display having a function of displaying an image, the method comprising:

a step of recording, into a second recorder, basis data, which is text data generated by the user, for specifying a basis used by the user to determine the mathematics expression specified by the at least one piece of mathematics expression data recorded in the first recorder and the operand numerical value specified by the at least one piece of operand numerical data recorded in the first recorder;

a related information collection step of collecting related information, which is information related to the basis specified by the basis data, from a predetermined search target;

a determination step of determining whether the basis data is required to be corrected in terms of a relation with the related information collected in the related information collection step;

an alert step of generating, when it is determined in the determination step that the basis data is required to be corrected, alert data, which is data for prompting the user to correct at least one of: the at least one piece of mathematics expression data; the at least one piece of operand numerical data; and the basis data;

a transmit step of transmitting the alert data generated in the alert step to the predetermined computer to be operated by the user; and an informing step of informing the user that the basis data is required to be corrected by displaying on the predetermined display of the predetermined computer an alert image in real time based on a constantly executing computer program, wherein the alert image is an image for visually informing, based on the alert data, the user of a requirement to correct at least one of: the at least one piece of mathematics expression data; the at least one piece of operand numerical data; or the basis data.

14. A non-transitory computer-readable medium storing instructions executable by a processor, which upon such execution, cause the processor to function as a future prediction simulation apparatus, the processor being caused to function as:

a first recorder configured to record at least one piece of mathematics expression data, which is data for specifying a mathematics expression required in order to execute a simulation for predicting a future, and at least one piece of operand numerical data, which is data for specifying an operand numerical value, which is a numerical value to be used in an operation when the operation is performed in accordance with the mathematics expression, both of the at least one piece of mathematics expression data and the at least one piece of operand numerical data being generated by a user;

a calculator configured to execute a simulation for predicting the future to generate prediction data, which is data relating to a prediction of the future, by using the operand numerical value specified by the at least one piece of operand numerical data recorded in the first recorder to perform an operation based on the mathematics expression specified by the at least one piece of mathematics expression data recorded in the first recorder;

a second recorder configured to record basis data, which is text data generated by the user, for specifying a basis used by the user to determine the mathematics expression specified by the at least one piece of mathematics expression data recorded in the first recorder and the operand numerical value specified by the at least one piece of operand numerical data recorded in the first recorder;

a related information collector configured to collect related information, which is information related to the basis specified by the basis data, from a predetermined search target;

a determiner configured to determine whether the basis data is required to be corrected in terms of a relation with the related information collected by the related information collector;

an alerter configured to generate, when it is determined by the determiner that the basis data is required to be corrected, alert data, which is data for prompting the user to correct at least one of: the at least one piece of mathematics expression data; the at least one piece of operand numerical data; and the basis data; and communication means for communicating via a predetermined network to and from a predetermined computer to be operated by the user and connected to a predetermined display having a function of displaying an image, wherein the communication means is configured to:

transmit the alert data generated by the alerter to the predetermined computer to be operated by the user; and inform the user that the basis data is required to be corrected by displaying on the predetermined display of the predetermined computer an alert image in real time based on a constantly executing computer program, wherein the alert image is an image for visually informing, based on the alert data, the user of a requirement to correct at least one of: the at least one piece of mathematics expression data; the at least one piece of operand numerical data; or the basis data.

15. The future prediction simulation apparatus according to claim 1, wherein the related information collector uses a computer software tool for numeric representation of text to determine the related information and the determiner uses a computer software tool for observing changes in degree of relation of a numeric representation of text to determine whether the basis data is required to be corrected.

16. The future prediction simulation apparatus according to claim 8, wherein the related information collector uses a computer software tool for numeric representation of text to determine the related information and the determiner uses a computer software tool for observing changes in degree of relation of a numeric representation of text to determine whether the basis data is required to be corrected.

17. The method according to claim 10, wherein collecting the related information comprises using a computer software tool for numeric representation of text to determine the related information and wherein determining whether the basis data is required to be corrected comprises using a computer software tool for observing changes in degree of relation of a numeric representation of text.

18. The non-transitory computer-readable medium according to claim 11, wherein the related information collector uses a computer software tool for numeric representation of text to determine the related information and the determiner uses a computer software tool for observing changes in degree of relation of a numeric representation of text to determine whether the basis data is required to be corrected.

19. The method according to claim 13, wherein collecting the related information comprises using a computer software tool for numeric representation of text to determine the related information and wherein determining whether the basis data is required to be corrected comprises using a computer software tool for observing changes in degree of relation of a numeric representation of text.

20. The non-transitory computer-readable medium according to claim 14, wherein the related information collector uses a computer software tool for numeric representation of text to determine the related information and the determiner uses a computer software tool for observing changes in degree of relation of a numeric representation of text to determine whether the basis data is required to be corrected.

* * * * *